United States Patent
Kaufman et al.

(10) Patent No.: US 11,513,530 B1
(45) Date of Patent: Nov. 29, 2022

(54) TECHNIQUES FOR COORDINATING MOVEMENT OF COMPONENTS WITHIN A WORKSPACE

(71) Applicant: Amazon Technologies, Inc., Seattle, WA (US)

(72) Inventors: Seth R. Kaufman, Arlington, MA (US); Megan Anne Smith, Waltham, MA (US); Ashish Shah, Lincoln, MA (US)

(73) Assignee: Amazon Technologies, Inc., Seattle, WA (US)

( * ) Notice: Subject to any disclaimer, the term of this patent is extended or adjusted under 35 U.S.C. 154(b) by 701 days.

(21) Appl. No.: 16/406,424

(22) Filed: May 8, 2019

(51) Int. Cl.
  *G05D 1/02* (2020.01)
  *G05B 19/418* (2006.01)
  *G05B 9/02* (2006.01)
  *H04W 4/80* (2018.01)

(52) U.S. Cl.
  CPC ............. *G05D 1/0234* (2013.01); *G05B 9/02* (2013.01); *G05B 19/41895* (2013.01); *G05D 1/0214* (2013.01); *G05D 1/0291* (2013.01); *H04W 4/80* (2018.02); *G05D 2201/0216* (2013.01)

(58) Field of Classification Search
  None
  See application file for complete search history.

(56) References Cited

U.S. PATENT DOCUMENTS

| | | |
|---|---|---|
| 6,166,371 A | 12/2000 | Milbrath et al. |
| 8,280,547 B2 | 10/2012 | D'Andrea et al. |
| 8,930,133 B2 | 1/2015 | Wurman et al. |
| 9,087,314 B2 | 7/2015 | Hoffman et al. |
| 10,248,120 B1 | 4/2019 | Siegel et al. |

(Continued)

FOREIGN PATENT DOCUMENTS

| | | |
|---|---|---|
| CN | 101517622 A | 8/2009 |
| CN | 108064212 A | 5/2018 |

(Continued)

OTHER PUBLICATIONS

David Durocher, An Overview of Remote Isolation Systems Applied in Process Industries, Aug. 2017. IEEE Transactions on Industry Applications, vol. 53, No. 4, (Year: 2017).*

(Continued)

*Primary Examiner* — Jeff A Burke
*Assistant Examiner* — Arslan Azhar
(74) *Attorney, Agent, or Firm* — Kilpatrick Townsend & Stockton LLP

(57) ABSTRACT

Systems and methods are provided herein for coordinating movement of components of a workspace utilizing a controller device. The controller device may operate in a first state. The computing device may be associated with an interaction area having a first access point and a second access point, wherein a light curtain is generated at the first access point. While operating in the first state, access to the interaction area is restricted. The computing device may transition to operating in a second state based at least in part on detecting the first breach, wherein operating in the second state comprises enabling access to the interaction area at the second access point. While operating in the second state, a second breach of the light curtain may be detected and at least one remedial action performed based on the detection.

19 Claims, 9 Drawing Sheets

(56) References Cited

U.S. PATENT DOCUMENTS

| | | |
|---|---|---|
| 10,347,369 B1 | 7/2019 | Dudzinski et al. |
| 2011/0232972 A1 | 9/2011 | McQueen et al. |
| 2012/0235579 A1 | 9/2012 | Chemel et al. |
| 2015/0073589 A1* | 3/2015 | Khodl .................. B65G 1/1378 700/218 |
| 2016/0121487 A1 | 5/2016 | Mohan et al. |
| 2016/0129917 A1 | 5/2016 | Gariepy et al. |
| 2016/0259061 A1 | 9/2016 | Carter |
| 2016/0271800 A1* | 9/2016 | Stubbs .................. B25J 9/1666 |
| 2017/0344023 A1 | 11/2017 | Laubinger et al. |
| 2018/0062328 A1 | 3/2018 | Westbury |
| 2018/0143321 A1 | 5/2018 | Skowronek et al. |
| 2019/0176323 A1* | 6/2019 | Coady ....................... B60L 3/12 |
| 2019/0381223 A1 | 12/2019 | Culbert et al. |
| 2020/0301432 A1 | 9/2020 | Bose et al. |
| 2021/0065107 A1 | 3/2021 | Jajula |

FOREIGN PATENT DOCUMENTS

| | | | |
|---|---|---|---|
| JP | 11024750 A | * | 1/1999 |
| JP | 2010023183 A | * | 2/2010 |

OTHER PUBLICATIONS

U.S. Department of Labor Occupational Safety and Health Administration, OSHA Fact Sheet, 2002. (Year: 2002).*

* cited by examiner

TECHNIQUES FOR COORDINATING MOVEMENT OF COMPONENTS WITHIN A WORKSPACE

BACKGROUND

Modern inventory systems, such as those in mail order warehouses, supply chain distribution centers, airport luggage systems, and custom-order manufacturing facilities, often utilize mobile robotic devices to move items and/or storage containers within a workspace. Coordinating tasks between the various components of these systems can be cumbersome. As inventory systems grow, the challenges of simultaneously completing a large number of packing, storing, and other inventory-related tasks utilizing these components becomes non-trivial. In systems tasked with responding to large numbers of diverse task requests, inefficient utilization of system resources, including space and equipment can result in lower throughput, unacceptably long response times, an ever-increasing backlog of unfinished tasks, and, in general, poor system performance. Coordination between various components of these systems is desirable to improve efficiency and throughput.

BRIEF DESCRIPTION OF THE DRAWINGS

Various embodiments in accordance with the present disclosure will be described with reference to the drawings, in which.

DETAILED DESCRIPTION

Figure 1:
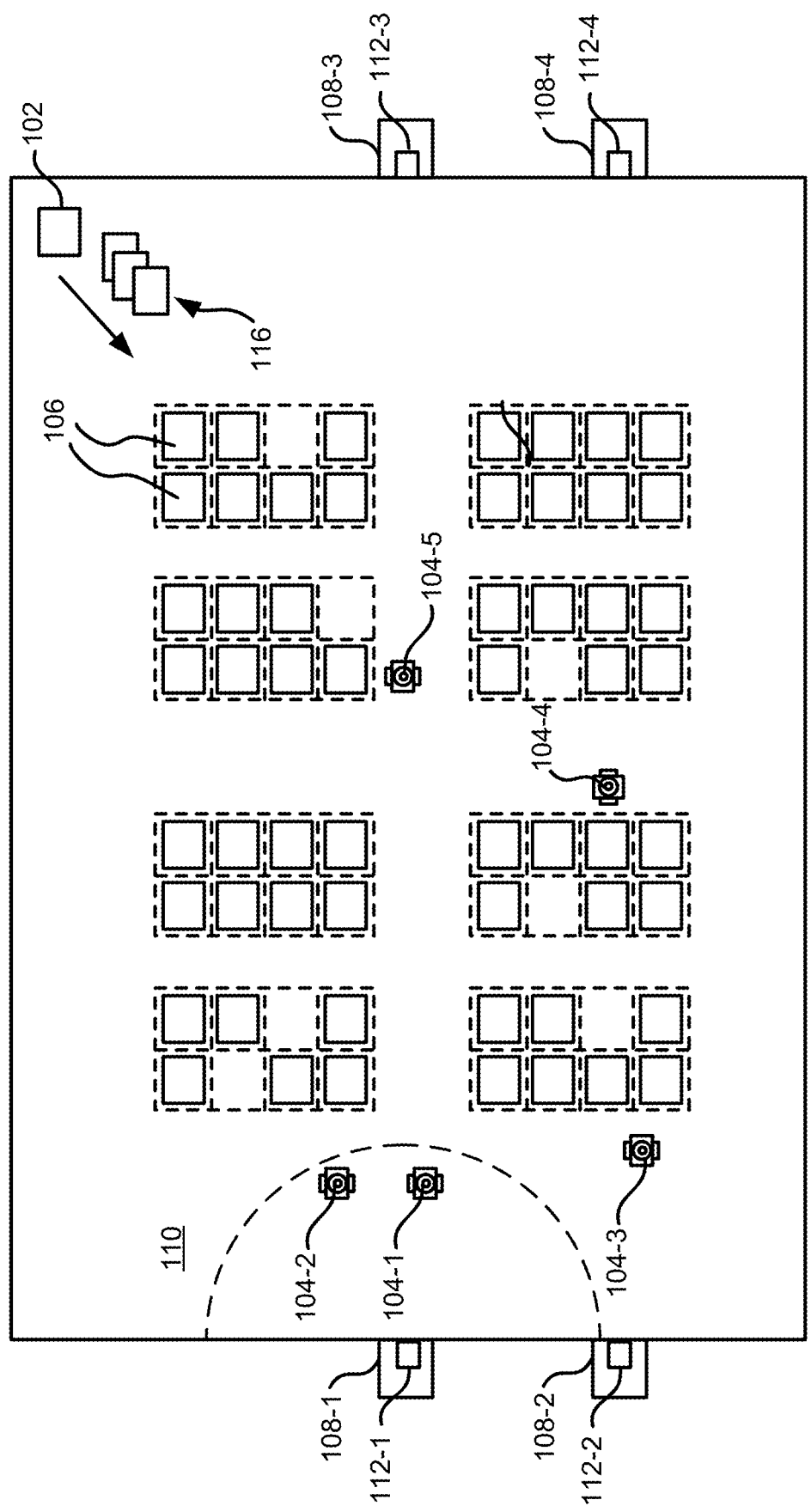
FIG. 1 is a schematic diagram illustrating an example environment suitable for implementing aspects of an inventory system, in accordance with at least one embodiment.

Techniques described herein are directed to systems and method for coordinating movements between components of a workspace which may include controlling access to a restricted area (e.g., an interaction area) within a system (e.g., an inventory system). In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order so as not to obscure the embodiment being described. Although examples may be provided which include an inventory system and/or workspace, it should be appreciated that the same techniques may be applied in a variety of contexts such as mail order warehouses, large item warehouses, supply chain distribution centers, airport luggage systems, and custom-order manufacturing facilities, to name a few.

In at least one embodiment, a number of mobile drive units may operate within a workspace of an inventory system. Each mobile drive unit may be a robotic device in any suitable form that may be configured to move a variety of storage containers (e.g., a gaylord, a pallet, a pod, etc.) and/or items within the workspace. The workspace may further include one or more workstations. A "workstation," as used herein, may include an area within which one or more tasks (e.g., stowing items, retrieving items, etc.) may be performed (e.g., by an operator via accessing the storage container). In some embodiments, this area (also referred to as an "interaction area" or "bay") may include two or more access points. As a non-limiting example, one access point (e.g., an access point facing the floor of the workspace) may be configured to receive a storage container as carried by a mobile drive unit. This access point may, in some embodiments, include a light curtain generated by any suitable number of light emitters and receivers. The light curtain may be positioned in any suitable fashion to cover any suitable portion of the access point. For example, the light curtain may cover a space spanning the width of the access point from the floor to some threshold height. An additional access point of the interaction area may include a gate, a door, or any suitable apparatus configured to physically block at least a portion of the additional point. Accordingly, a first access point could include a light curtain with which an MDU entering or exiting the interaction area may be detected and a second access point, different than the first access point, through which access to the interaction area may be obtained (e.g., by an operator of the workstation).

In some embodiments, the controller device may restrict access to the interaction area at the second access point. By way of example, the controller device may be configured to cause the gate/door at the access point to be locked/unlocked and/or opened/closed. In some embodiments, the controller device may transmit data to an access device associated with the gate/door in order to cause the gate/door to be locked/unlocked and/or opened/closed. The controller device may be configured to communicate with a station computing device, one or more indicator devices, one or more access devices, one or more sensor devices, and the like, to perform a variety of operations related to controlling access to the interaction area, coordinating tasks between an operator of the workstation and one or more mobile devices, and/or coordinating movement of mobile devices near the workstation and/or within the interaction area.

In operation, an operator of the workstation may connect with a management system of the workspace utilizing the station computing device. The management system may be configured to assign tasks, determine instructions and/or routes to perform those tasks, and communicate with the mobile drive units, and/or the station computing devices, and/or user devices operated by personnel within the workspace to effectuate the completion of those tasks. In some embodiments, an operator of a workstation may provide user credentials (e.g., username and/or password, identification information, etc.) via an input device of the station computing device (e.g., a keyboard, an RFID reader, a barcode reader, etc.). The user may be authenticated and logged onto the station computing device. Using an interface provided by the station computing device, the user may select a type of task or a particular task and/or provide an indication that the user is available for task assignment. In response, the management system may assign the operator/station one or more tasks within the system (e.g., stowing items within a storage container at the workstation, retrieving particular items from particular storage containers, and the like). Additionally, the management system may assign one or more mobile drive units tasks assignments that correspond to conveying one or more storage containers to the station in accordance with the tasks assigned to the operator/station.

A controller device, in communication with the various components of the workstation, may be configured to monitor the light curtain situated at an access point of an interaction area of the workstation. This monitoring may occur even during times when the workstation is not actively being utilized by an operator. In some embodiments, such monitoring may commence in response to an indication that the workstation and/or interaction area is in use. By way of example, in response to receiving an indication that the workstation is in use, or at any suitable time (e.g., upon powering on), the controller device may transition to a "restricted" state. While operating in a restricted state, the controller device may be configured to restrict access to the interaction area via at least one access point. By way of example, while operating in a restricted state, the controller device may ensure that a door and/or gate of the interaction area is closed and/or locked. Thus, while operating in the restricted state, an operator of the workstation can be physically restricted from entering the interaction area.

In some embodiments, the workstation may further include an indicator device. In some embodiments, this indicator device may provide visual and/or audio indications of particular states of operation associated with the interaction area. In some embodiments, the indicator device may include a single area or multiple distinct areas. In some embodiments, the indicator device may include three areas, each area having a number of lights sources from which light may be emitted. These areas may be the same size, or the area may vary in size. The indicator device may be situated at any suitable location within the workspace. For example, the indicator device may be positioned above the light curtain such that the light emitted from the device is viewable from outside the interaction area (e.g., from the floor of the warehouse, from a position outside any suitable access point, from the workstation, etc.). The exact height, orientation, and or location at which the indicator device is placed may be predetermined.

In response to transitioning to the restricted state, and/or while operating in the restricted state, the controller device may communicate (e.g., via a wireless and/or a wired connection) with the indicator device to cause the indicator device to display an indication of the restricted state. As a non-limiting example, the controller device may transmit any suitable data to cause the indicator device to display yellow light at one or more areas. As a specific example, the indicator device may present yellow light utilizing a top area and a bottom area, while a middle area of the indicator device remains unlit. In some embodiments, the indicator device (or another component of the workstation such as a speaker) may be further configured to provide an audible indication of the restricted state.

While operating in the restricted state, the controller device may detect breaches of the light curtain. For example, should an object (e.g., a storage container, a mobile drive unit, etc.) traverse through the light curtain, the breach may be detected. As a non-limiting example, one or more receivers corresponding to one or more light emitters of the light curtain may provide data indicating that the light from a corresponding light emitter was not received. In some embodiments, one or more additional motion sensors situated within the interaction area may provide the controller device sensor data indicating an object is located within the interaction area. The controller device, upon detecting the first breach may determine when activities within the interaction area have been concluded. For example, a mobile drive unit may breach the light curtain while moving a storage container. The storage container and/or mobile drive unit may be detected via the light curtain and/or the one or more sensors of the interaction area. At a subsequent time, the controller device may detect a second breach of the light curtain (e.g., indicative of the mobile drive unit leaving the interaction area). In some embodiments, the controller device may determine that a threshold period of time has elapsed since the first breach was detected and/or since a change in the sensor data has occurred (e.g., indicating the object has not exited the interaction area since entering the interaction area for at least a threshold period of time). Based at least in part on the data described above (e.g., indicative of a second breach after a first breach or an unchanged condition), the controller device may be configured to determine the activity within the interaction area has concluded. Upon making this determination, the controller device may transition to a "ready" state.

In response to transitioning to the ready state, and/or while operating in the ready state, the controller device may communicate (e.g., via a wireless and/or a wired connection) with the indicator device to cause the indicator device to display (and/or sound) an indication of the ready state. As a non-limiting example, the controller device may transmit any suitable data to cause the indicator device to display green light at one or more areas. As a specific example, the indicator device may present green light utilizing a middle area of the indicator device, while a top area and a bottom area of the indicator device remain unlit.

While operating in the ready state, the controller device may monitor for breaches of the light curtain. For example, should an object (e.g., an item, an object, a box, the operator, a mobile drive unit, etc.) traverse through the light curtain, the breach may be detected in the manner described above. The controller device, upon detecting a breach of the light curtain while operating in a ready state may immediately transition to a "breach" state.

While operating in this breach state, the controller device with the indicator device to cause the indicator device to display (and/or sound) an indication of the breach state. As a non-limiting example, the controller device may transmit any suitable data to cause the indicator device to display red light at one or more areas. As a specific example, the indicator device may present red light utilizing a top area, a middle area, and a bottom area of the indicator device.

In some embodiments, the controller device may further be configured with a wireless communications transmitter device configured for short-range wireless communications. By way of example, the wireless communications transmitter device may be configured to transmit a short range radio signal. In some embodiments, each mobile drive unit operating within the workspace may include a receiver configured to receive these short-range signals. In at least one embodiment, receipt of the signal and/or any suitable data transmitted by the wireless communications transmitter device may cause a receiving mobile drive unit to halt motion. Due to the short range nature of the signal, this may cause mobile drive units within a threshold distance of the controller device (e.g., located at or near the interaction area, located at the workstation, etc.) to halt motion, while any remaining mobile drive units operating outside the threshold distance may proceed with their assigned tasks. Accordingly, localized safety measures are enabled utilizing the techniques disclosed herein.

In scenarios in which a breach state is reached, the controller device may be configured to continually and/or periodically transmitting the short range signal for the duration of operation in the breach state. Subsequently, the operator and/or an authorized user (e.g., a manager associated with higher authority credentials) may provide an electronic override via user input provided at the station computing device. Alternatively, the controller device itself may include an input mechanism (e.g., a scanner, keyboard, mechanical key) with which an override/reset intent may be entered. Upon receiving an indication of override/reset, the controller device may be configured to cease transmission of the short range signal and transition back to a ready state. While operating in the ready state, the controller device may transmit data to the indicator device to update the provided indication to indicate current state operation (e.g., transmit back to displaying the green area as discussed above). In some embodiments, the indication of the override/reset may only be performed from a position within the workspace that is outside the workstation or interaction area.

In some embodiments, the operator may enter an indication (e.g., via the station computing device, via a release device, etc.) that he has completed a task with the currently storage container and/or that he is ready to commence a next task. The station computing device may transmit a release request to the controller device to request that access to the interaction area be restricted. If an object is determined to be breaching the light curtain, the controller device may be configured to wait a period of time (e.g., 3 seconds, 5 seconds, etc.) to determine whether the breach is resolved. If an object is still breaching the light curtain after the time period has elapsed, the controller device may deny the request to release. However, if the light curtain is not being breached and/or the breach is resolved during a threshold period of time, the controller device may be configured to transition to the restricted state and further cause the indicator device to display an indication of the restricted state. As part of transitioning to the restricted state, the controller device may cause a gate/door of the interaction area to close and/or lock such that access to the interaction area may not be gained through that access point. The controller device, in some cases, may transmit an indication to the station computing device and/or the management system indicating that access to the interaction area is restricted. In some embodiments, the controller device may transmit an indication of the current state to an indicator device associated with the interaction area to cause the indicator device to display an indication of the restricted state (e.g., one or more yellow lights, as discussed above). Once transitioned, the controller device may grant the release request (e.g., by transmitting data to the station computing device and/or the management system), which may cause the management system to instruct a mobile drive unit to retrieve one or more objects (e.g., a pallet, a gaylord, etc.) from the interaction area.

It should be appreciated that the techniques discussed above are applicable in contexts other that inventory situations. Utilizing the techniques discussed herein, coordination within the inventory system is improved by ensuring that operators are restricted from accessing an interaction area during times at which movement may be occurring and/or the interaction area may be in use (e.g., by an MDU). Additionally, or alternatively, by utilizing the controller device, the system may ensure that breaches of the light curtain are detected while an operator is located in the interaction area. Should a breach occur during this time, the short range nature of the signal provided by the controller device may halt nearby mobile drive units to ensure efficient use of the workspace and an increase in throughput during such instances. Rather than shutting down an entire floor due to a breach being detected, one or more remedial actions (e.g., the halting of one or more mobile drive units) may be localized to affect only components located within a threshold distance of the breach. As yet another enhancement, once a storage container is placed at the interaction area, the controller device may further improve coordination within the workstation by ensuring that the storage container may not be moved while it is being accessed by an operator. Any suitable combination of the above improvements can lead to a more efficient use of a workspace and/or increased throughput of the system as a whole.

FIG. 1 is a schematic diagram illustrating an example environment suitable for implementing aspects of an inventory system 100, in accordance with at least one embodiment. As a non-limiting example, the inventory system 100 may include a management module 102, one or more mobile drive units (e.g., mobile drive unit 104-1, mobile drive unit 104-2, mobile drive unit 104-3, mobile drive unit 104-4, and mobile drive unit 104-5, collectively referred to as "mobile drive units 104"), one or more storage containers (e.g., storage containers 106), and one or more workstations (e.g., workstation 108-1, workstation 108-2, workstation 108-3, workstation 108-4, collectively referred to as "workstations 108"). In some embodiments, workstations 108 may include one or more controller devices (e.g., controller device 112-1, controller device 112-2, controller device 112-3, and controller device 112-4, collectively referred to as "controller devices 112"). In some embodiments, the workstations 108 may each include an interaction area within which an operator may interact with the storage containers 106 placed at the interaction area by the mobile drive units 104. The interaction area will be discussed in further detail below in connection with the following figures.

The mobile drive units 104 may transport storage containers 106 between points within a workspace 110 (e.g., a warehouse, a storage facility, or the like) in response to commands communicated by management module 102. While the management module 102 is depicted in FIG. 1 as being separate from the mobile drive units 104, it should be appreciated that the management module 102, or at least some aspects of the management module 102, may be additionally or alternatively be performed by a processor of the mobile drive units 104. Within the inventory system 100, each of the storage containers 106 may store one or more types of inventory items. As a result, inventory system 100 may be capable of moving inventory items between locations within the workspace 110 to facilitate the entry, processing, and/or removal of inventory items from inventory system 100 and the completion of other tasks involving inventory items.

In accordance with some embodiments, the management module 102 may assign tasks to appropriate components of inventory system 100 and may coordinate operations of the various components in completing the tasks. The management module 102 may select components of inventory system 100 (e.g., workstations 108, mobile drive units 104, and/or workstation operators (not depicted), etc.) to perform these tasks and communicate appropriate commands and/or data to the selected components to facilitate completion of these operations. In some embodiments, workstation operators may utilize a computing devices such as a station computing device (discussed further with respect to FIG. 2), a scanner, a smart device, or the like to receive such commands or exchange any suitable information with the management module 102. Although shown in FIG. 1 as a single, discrete component, the management module 102 may represent multiple components and may represent or include portions of the mobile drive units 104 or other elements of the inventory system 100.

The mobile drive units 104 may move storage containers 106 between locations within the workspace 110. The mobile drive units 104 may represent any devices or components appropriate to move (e.g., propel, pull, etc.) a storage container based on the characteristics and configuration of the storage containers 106 and/or other elements of inventory system 100. In a particular embodiment of inventory system 100, the mobile drive units 104 represent independent, self-powered devices configured to freely move about the workspace 110. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 104 represent elements of a tracked inventory system configured to move the storage containers 106 along tracks, rails, cables, crane system, or other guidance or support elements traversing the workspace 110. In such an embodiment, the mobile drive units 104 may receive power and/or support through a connection to the guidance elements, such as a powered rail. Additionally, in particular embodiments of the inventory system 100 the mobile drive units 104 may be configured to utilize alternative conveyance equipment to move within the workspace 110 and/or between separate portions of the workspace 110.

Additionally, the mobile drive units 104 may be capable of communicating with the management module 102 to receive information identifying selection of the storage containers 106, transmit the locations of the mobile drive units 104, or exchange any other suitable information to be used by the management module 102 or the mobile drive units 104 during operation. The mobile drive units 104 may communicate with the management module 102 wirelessly, using wired connections between the mobile drive units 104 and the management module 102, and/or in any other appropriate manner. As one example, particular embodiments of the mobile drive unit 20 may communicate with the management module 102 and/or with one another using 802.11, Bluetooth®, or Infrared Data Association (IrDA) standards, or any other appropriate wireless communication protocol. As another example, in a tracked inventory system 100, tracks or other guidance elements upon which the mobile drive units 104 move may be wired to facilitate communication between the mobile drive units 104 and other components of the inventory system 100. In general, the mobile drive units 104 may be powered, propelled, and controlled in any manner appropriate based on the configuration and characteristics of the inventory system 100.

In at least one embodiment, the storage containers 106 store inventory items. The storage containers 106 are capable of being carried, rolled, and/or otherwise moved by the mobile drive units 104. In some embodiments, the storage containers 106 may include a plurality of faces, and each storage component (e.g., a bin, a tray, a shelf, an alcove, etc.) may be accessible through one or more faces of the storage container 106. The mobile drive units 104 may be configured to rotate the storage containers 106 at appropriate times to present a particular face to an operator (e.g., human personnel) or other components of the inventory system 100.

In at least one embodiment, inventory items represent any objects suitable for storage, retrieval, and/or processing in an automated inventory system 100. For the purposes of this description, "inventory items" (also referred to as "items" or "an item") may represent any one or more objects of a particular type that are stored in the inventory system 100. In at least one example, the inventory system 100 may represent a mail order warehouse facility (e.g., operated by an electronic marketplace provider), and the items within the warehouse facility may represent merchandise stored in the warehouse facility. As a non-limiting example, the mobile drive units 104 may retrieve the storage containers 106 containing one or more inventory items requested in an order to be packed for delivery to a customer. Moreover, in some embodiments of the inventory system 100, boxes containing completed orders may themselves represent inventory items.

In particular embodiments, the inventory system 100 may also include one or more workstations 108. The workstations 108 represent locations designated for the completion of particular tasks involving inventory items. Such tasks may include the removal of inventory items from the storage containers 106, the introduction of inventory items into the storage containers 106, the counting of inventory items in the storage containers 106, the decomposition of inventory items (e.g. from pallet- or case-sized groups to individual inventory items), the consolidation of inventory items between the storage containers 106, and/or the processing or handling of inventory items in any other suitable manner. In particular embodiments, the workstations 108 may represent the physical locations where a particular task involving inventory items can be completed within the workspace 110. In alternative embodiments, the workstations 108 may represent both the physical location and also any appropriate equipment for processing or handling inventory items, such as robotic devices (e.g., robotic arms), scanners for monitoring the flow of inventory items in and out of the inventory system 100, communication interfaces for communicating with the management module 102, and/or any other suitable components. The workstations 108 may be controlled, entirely or in part, by human operators or may be fully automated.

In at least one embodiment, the workspace 110 represents an area associated with the inventory system 100 in which the mobile drive units 104 can move and/or the storage containers 106 can be stored. For example, the workspace 110 may represent all or part of the floor of a mail-order warehouse in which the inventory system 100 operates. Although FIG. 1 shows, for the purposes of illustration, an embodiment of the inventory system 100 in which the workspace 110 includes a fixed, predetermined, and finite physical space, particular embodiments of the inventory system 100 may include the mobile drive units 104 and the storage containers 106 that are configured to operate within the workspace 110 that is of variable dimensions and/or an arbitrary geometry. While FIG. 1 illustrates a particular embodiment of the inventory system 100 in which the workspace 110 is entirely enclosed in a building, alternative embodiments may utilize the workspace 110 in which some or all of the workspace 110 is located outdoors, within a vehicle (such as a cargo ship), or otherwise unconstrained by any fixed structure. A workstation may include an interaction area in which a storage container may be placed. Exemplary features of an interaction area may be discussed in more detail in connection with FIGS. 2 and 3.

In operation, the management module 102 may select appropriate components to complete particular tasks and may transmit task assignments 116 to the selected components to trigger completion of the relevant tasks. Each of the task assignments 116 defines one or more tasks to be completed by a particular component. These tasks may relate to the retrieval, storage, replenishment, and counting of inventory items and/or the management of the mobile drive units 104, the storage containers 106, the workstations 108, workstation operators, and/or other components of the inventory system 100. Depending on the component and the task to be completed, a task assignment may identify locations, components, and/or actions/commands associated with the corresponding task and/or any other appropriate information to be used by the relevant component in completing the assigned task.

In particular embodiments, the management module 102 may generate task assignments 116 based, in part, on inventory requests that the management module 102 receives from other components of the inventory system 100 and/or from external components in communication with the management module 102. These inventory requests identify particular operations to be completed involving inventory items stored or to be stored within the inventory system 100 and may represent communication of any suitable form. For example, in particular embodiments, an inventory request may represent a shipping order specifying particular inventory items that have been purchased by a customer and that are to be retrieved from the inventory system 100 for shipment to the customer. After generating one or more of the task assignments 116, the management module 102 may transmit the generated task assignments 116 to appropriate components (e.g., mobile drive units 104, the workstations 108, corresponding operators, etc.) for completion of the corresponding task. The relevant components may then execute their assigned tasks.

With respect to the mobile drive units 104 specifically, the management module 102 may, in particular embodiments, communicate task assignments 116 to selected mobile drive units 104 that identify one or more destinations for the selected mobile drive units 104. The management module 102 may select a mobile drive unit (e.g., mobile drive unit 104-1) to assign the relevant task based on the location or state of the selected mobile drive unit, an indication that the selected mobile drive unit has completed a previously-assigned task, a predetermined schedule, and/or any other suitable consideration. These destinations may be associated with an inventory request the management module 102 is executing or a management objective the management module 102 is attempting to fulfill. For example, the task assignment may define the location of a storage container 106 to be retrieved, a workstation to be visited (e.g., workstation 108-1), or a location associated with any other task appropriate based on the configuration, characteristics, and/or state of inventory system 100, as a whole, or individual components of the inventory system 100.

As part of completing these tasks the mobile drive units 104 may dock with and transport the storage containers 106 within the workspace 110. The mobile drive units 104 may dock with the storage containers 106 by connecting to, lifting, and/or otherwise interacting with the storage containers 106 in any other suitable manner so that, when docked, the mobile drive units 104 are coupled to and/or support the storage containers 106 and can move the storage containers 106 within the workspace 110. The mobile drive units 104 and storage containers 106 may be configured to dock in any manner suitable to allow a mobile drive unit to move a storage container within workspace 110. In some embodiments, the mobile drive units 104 represent all or portions of the storage containers 106. In such embodiments, the mobile drive units 104 may not dock with the storage containers 106 before transporting the storage containers 106 and/or the mobile drive units 104 may each remain continually docked with a storage container.

In some embodiments, the management module 102 may be configured to communicate the task assignments 116 to the workstations 108 to instruct those components (and/or robotic devices and/or operators of the workstations 108) to perform one or more tasks. The mobile drive units 104 and/or station computing devices of the workstations 108 may individually be configured to provide task performance information to the management module 102. Task performance information may include any suitable data related to the performance of an assigned task. By way of example, a mobile drive unit may send task performance information to the management module 102 indicating that the task of moving a particular storage container to a particular workstation (and/or interaction area of the workstation) has been completed. A station computing device may transmit task performance information to the management module 102 indicating that an item has been placed in or removed from the selected storage container. Generally, any suitable information associated with task performance (e.g., a task identifier, a time of completion, an error code or other indication that the task was unsuccessful, a reason code or other indication as to why task performance was unsuccessful, etc.) may be provided as part of the task performance information.

While the appropriate components of inventory system 100 complete assigned tasks, the management module 102 may interact with the relevant components to ensure the efficient use of space, equipment, manpower, and other resources available to inventory system 100. As one specific example of such interaction, management module 102 is responsible, in particular embodiments, for planning the paths the mobile drive units 104 take when moving within the workspace 110 and for allocating use of a particular portion of the workspace 110 to a particular mobile drive units 104 for purposes of completing an assigned task. In such embodiments, the mobile drive units 104 may, in response to being assigned a task, request a path to a particular destination associated with the task.

Components of the inventory system 100 (e.g., the mobile drive units 104, and/or the station computing devices of the workstations 108, and/or controller device(s) 112) may provide information to the management module 102 regarding their current state, other components of the inventory system 100 with which they are interacting, and/or other conditions relevant to the operation of the inventory system 100. This may allow the management module 102 to utilize feedback from the relevant components to update algorithm parameters, adjust policies, or otherwise modify its decision-making to respond to changes in operating conditions or the occurrence of particular events.

In addition, while the management module 102 may be configured to manage various aspects of the operation of the components of the inventory system 100, in particular embodiments, the components themselves may also be responsible for decision-making relating to certain aspects of their operation, thereby reducing the processing load on the management module 102.

Thus, based on its knowledge of the location, current state, and/or other characteristics of the various components of the inventory system 100 and an awareness of all the tasks currently being completed, the management module 102 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making (such as the techniques provided by the controller device(s) 112 as discussed herein), particular embodiments of the inventory system 100 may be able to support a number of techniques for efficiently executing various aspects of the operation of the inventory system 100. As a result, particular embodiments of the management module 102 may, by implementing one or more management techniques described below, enhance the efficiency of the inventory system 100 and/or provide other operational benefits.

Figure 2:
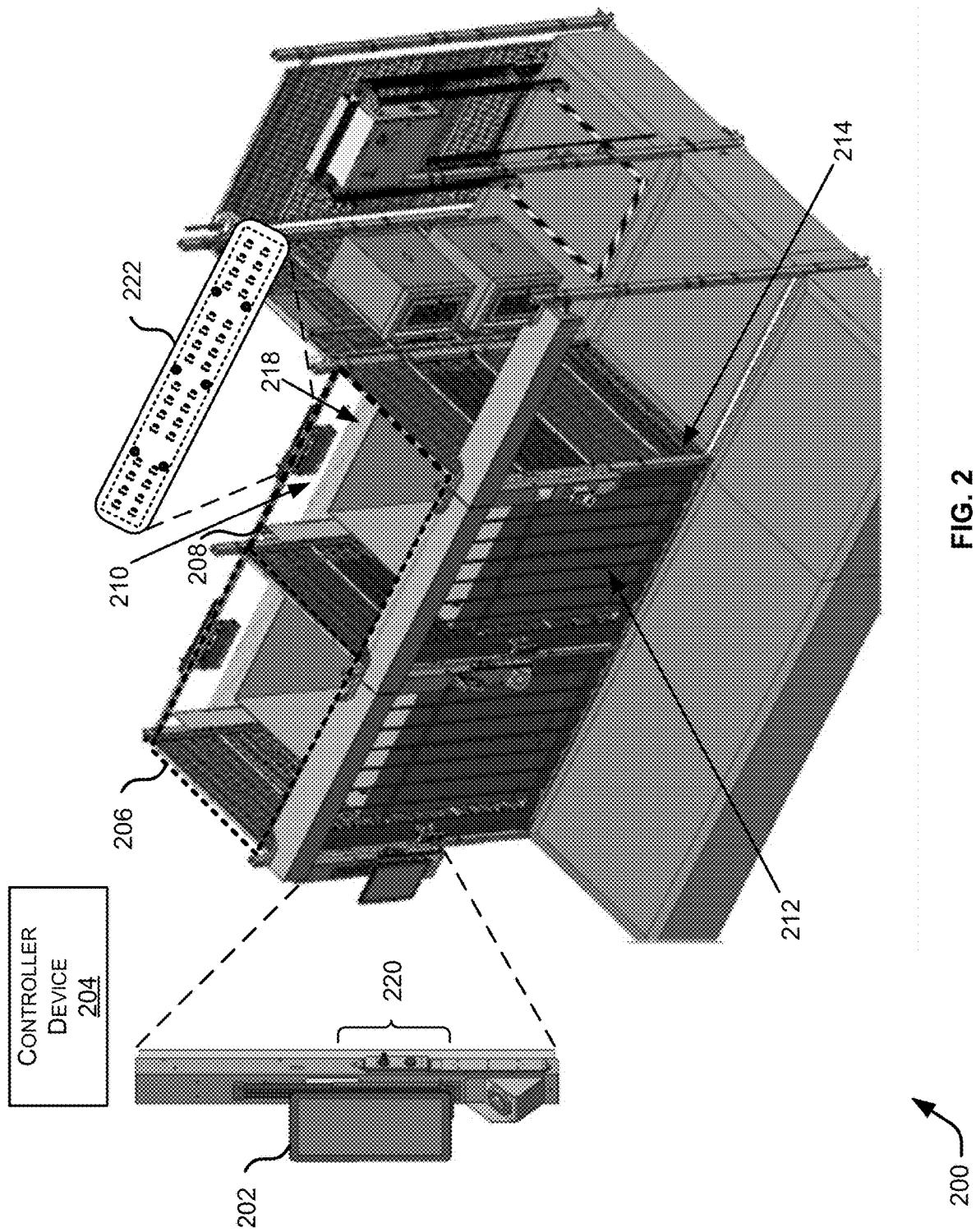
FIG. 2 illustrates an exemplary workstation having a number of computing components, in accordance with at least one embodiment.

FIG. 2 illustrates an exemplary workstation 200 having a number of computing components, in accordance with at least one embodiment. The workstation 200 may be configured in any suitable matter and may span any suitable area of any suitable dimensions. In at least one embodiment, the workstation 200 may include any suitable number of components such as station computing device 202. Station computing device 202 (an example of computing device(s) 508 described below in connection with FIG. 5) may be configured to manage task assignment and/or completion of tasks within workstation 200. In some embodiments, the station computing device 202 may include any suitable user interfaces and/or input/output devices to enable an operator to sign in to the station computing device 202. In some embodiments, the station computing device 202 may be configured to communicate with the management module 102 of FIG. 1 to receive task assignments and/or transmit requests to release a mobile drive unit from the interaction area. The station computing device 202 may be configured to transmit any suitable data indicating an operating state of the workstation 200 as provided by the controller device 204 (e.g., an example of the controller device(s) 112 of FIG. 1).

Controller device 204 may be situated in any suitable location of the workstation 200. By way of example, a controller device 204 may be positioned within an interaction area (e.g., an interaction area 206), at a perimeter of the interaction area, or at any suitable location of the workstation 200. In some embodiments, the workstation 200 may include one or more interaction areas (e.g., interaction area 206 and interaction area 208). In some embodiments, the controller device 204 may correspond to a single interaction area or multiple interaction area. Thus, the interaction areas 206 and 208 may be managed by a single controller device (e.g., controller device 204) or multiple corresponding controller devices. In some embodiments, the controller device 204 may be configured to communicate with any suitable component of the workstation 200.

In some embodiments, the interaction area (e.g., the interaction area 206, the interaction area 208) may be a fully or partially enclosed area having one or more access points. By way of example, the interaction area 208 includes access point 210 and access point 212. In some embodiments, access point 210 may be utilized for conveyance and/or delivery operations (e.g., an MDU delivering or retrieving a storage container), while access point 212 may be utilized for operator access and/or to place an object within the storage container and/or on an MDU located within the interaction area 206.

Each interaction area may include one or more sensors (not depicted) for detecting objects within the interaction area. The sensors may include, for example, time of flight sensors configured to detect an object within the interaction area. In some embodiments, the one or more sensors may be placed at predetermined locations and/or at a predetermined spacing from one another. As a non-limiting example, one sensor may be positioned (e.g., at location 214) to sense an object at a position just outside the access point 212. The exact number of sensors and/or placement location(s) of these sensors within the interaction area may vary. For example, a sensor may be located at a location that is different from the location 214. As another example, one or more sensors may be configured to detect objects within the interaction area 208, where the sensors are placed at various locations (e.g., one at location 214) and configured to detect objects within the interaction area 208.

In some embodiments, the access point 210 may include a light curtain (e.g., the light curtain 218) that is configured to entirely or partially span the area of the access point 210. The light curtain 218 may be generated by any suitable number and type of light emitters and receivers. In some embodiments, the light emitters may each produce light aimed at a corresponding light receiver. Each light receiver may be configured to receive light from a corresponding light emitter. Each pair of light emitters/receivers may be spaced at any suitable distance from one another to cover any suitable area of the access point 210. It should be appreciated that any access point of an interaction area may include a similar light curtain. In some embodiments, the light curtain 218 may span the width of the access point 210 from the floor to a threshold height to be configured to detect an MDU entering or exiting the interaction area 208. Although depicted as being position at the access point 210, it should be appreciated that the light curtain 218 may be positioned within the interaction area (e.g., at location 214).

The workstation 200 may include a reset interface 220. The reset interface 220 may include any suitable combination of one or more interface elements such as a keyboard, toggle, button, mechanical key slot, etc. In some embodiments, interacting with the reset interface 220 may cause data and/or a signal to be sent to the station computing device 202 and/or the controller device 204 indicating a reset request. Upon receiving such a request, the station computing device 202 and/or the controller device 204 may cause the controller device 204 to transition to another state (e.g., from a breach state to a ready state, from a breach state to a restricted state, etc.).

Figure 3:
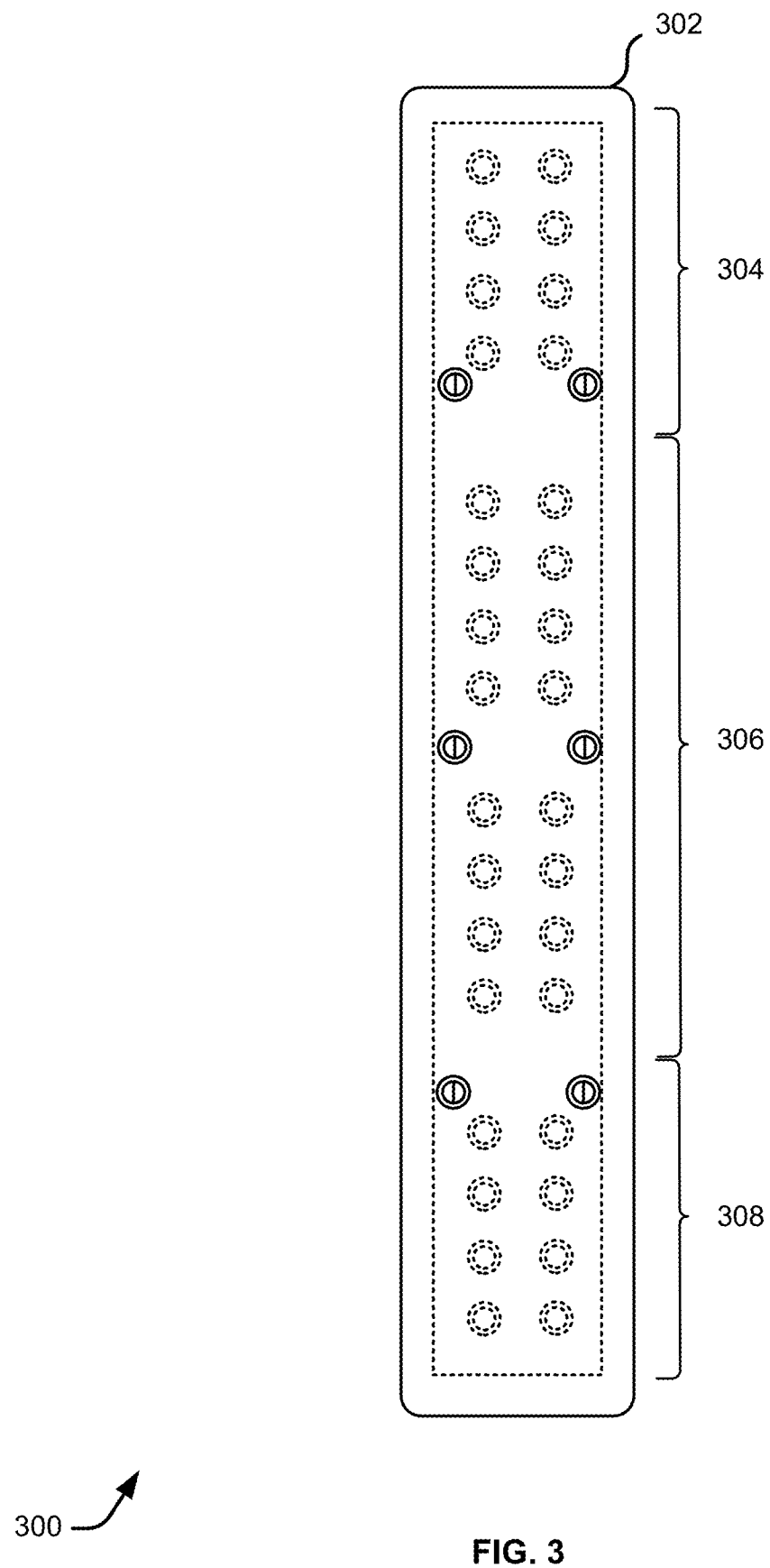
FIG. 3 is a schematic diagram illustrating an exemplary indicator device, in accordance with at least one embodiment.

In some embodiments, each interaction area may include an indicator device (e.g., the indicator device 222). FIG. 3 illustrates an exemplary indicator device 302 (e.g., the indicator device 222 of FIG. 2), in accordance with at least one embodiment. The indicator device 302 may include one or more areas. As depicted, the indicator device 302 includes three areas (e.g., top area 304, middle area 306, and bottom area 308).

The indicator device 302 may be constructed from any suitable solid substrate (e.g., plastic, glass, etc.) through which light projected from a number of light emitters is visible. In some embodiments, the indicator device 302 may include any suitable number of light emitters (e.g., LED lights). Each of the light emitters may be configured to provide light of a variety of colors (e.g., red, yellow, green, blue, etc.). In some embodiments, the substrate of the indicator device 302 may be beveled on the edges. In some embodiments, top area 304, middle area 306 and bottom area 308 utilize a single substrate, while in other embodiments, separate substrates may be utilized for each corresponding area and attached together.

The indicator device 302 may include one or more processors (not depicted) configured to receive data from a controller device (e.g., the controller device 204 of FIG. 2) and display state information in response to receiving such data. In some embodiments, the light emitters of area 304 and area 308 may be configured to provide red or yellow light depending on the current operational state of the controller device. The light emitters of area 306 in some embodiments, may be configured to produce red or green light depending on the current operational state of the controller device.

In some embodiments, the indicator device 302 may be configured to display yellow light from the emitters of areas 304 and 308, upon receipt of an indication that the controller device (e.g., the controller device 204) is operating in a restricted state. In some embodiments, the indicator device 302 may be configured to display green light from area 306 upon receipt of an indication that the controller device is operating in a ready state. In some embodiments, the indicator device 302 may be configured to display red light from the emitters of areas 304, 306, and 308, upon receipt of an indication that the controller device is operating in a breach state. It should be appreciated that the light emitters of each area may be differently utilized to provide the same or different colored light, in the same, or different patterns discussed herein.

In some embodiments, the indicator device 302 may include one or more speakers through which an audible sound may be emitted. The particular pitch and/or pattern of the sound may vary but may generally correspond to the current operating state of the controller device.

Figure 4:
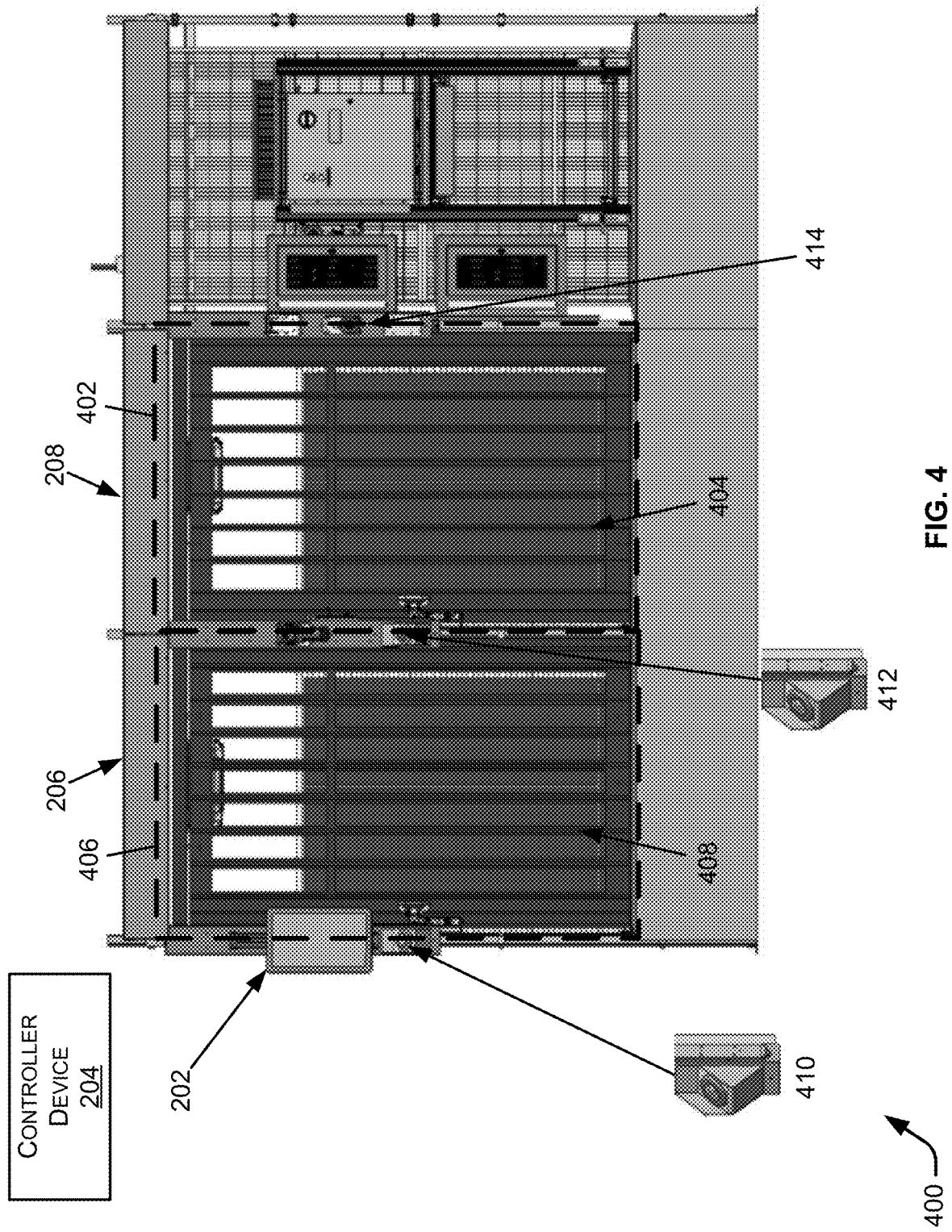
FIG. 4 illustrates another view of the exemplary workstation of FIG. 2, in accordance with at least on embodiment.

FIG. 4 illustrates another view of the workstation 200 of FIG. 2, in accordance with at least one embodiment. The workstation 200 may further include gates and/or doors at one or more access points. By way of example, access point 402 (e.g., access point 212 of FIG. 2) may include gate 404 and may correspond to interaction area 208 of FIG. 2. Similarly, access point 406 may include gate 408 and may correspond to interaction area 206 of FIG. 2. The gates (or doors or other suitable physical barriers) may be manually moveable and/or the gates may be operated by one or more motors that may open and/or close the gates. In some embodiments, the controller device 204 may be configured to control movement of the gates 404 and/408. In some embodiments, the controller device 204 may be configured to control a lock corresponding to the gate 404 and/or the gate 408 such that the controller device 204 may cause the gate 404 and/or the gate 408 to be locked (e.g., un-openable, un-closeable, etc.). In other embodiments, an access device (not depicted) may control the locking/unlocking and/or opening/closing of the gates 404 and/or 408. In such situations, the controller device 204 may transmit any suitable information to cause the access device to lock, unlock, open, and/or close the gates 404 and/or 408.

In some embodiments, each interaction area may correspond to a release device. For example interaction area 206 may correspond release device 410, while interaction area 208 may correspond to release device 412. In some embodiments, a release device may be in any suitable form such as a keyboard, a button, a toggle, etc. The release device may be configured to transmit (e.g., to the station computing device 202) a release request corresponding to an interaction area. Upon receipt of the release request, the station computing device 202 may be configured to transmit a release request to the controller device corresponding to the interaction area for which a release is requested. The controller device 204 may determine whether or not an object is currently breaching the light curtain and/or if motion may be inferred within the interaction area from sensor data collected from one or more additional sensors. If there is no current breach and/or no motion is inferred, the controller device 204 may be configured to grant the release request and transmit data to the station computing device 202 indicating the same. The station computing device 202 may then submit a request to the management module 102 of FIG. 1 in order to cause a storage container within the interaction area to be removed.

The workstation 200 may include a stop request device (e.g., the stop request device 414). The stop request device may be in any suitable form such as a keyboard, a button, a toggle, etc. Upon interacting with the stop request device 414 (e.g., the button of the stop request device 414 is pressed), the controller device 204 (or any suitable controller device of the workstation 200) may be configured to begin transmitting a short range wireless signal. The mobile drive units of the workspace (e.g., the workspace 110 of FIG. 1) may be configured to halt movement upon receipt of the short range wireless signal and remain motionless so long as the signal is being received (e.g., and/or until a predetermined period of time has elapsed since the signal was last received). The controller device 204 may be configured to continue to transmit this signal (e.g., continuously, according to a predetermined interval, etc.) until a reset command is provided at the station computing device 202 and/or at the reset interface 220 of FIG. 2. It should be appreciated that the stop request device 414 may alternatively be configured to transmit data to the management system (e.g., the management system 102 of FIG. 1) to cause all MDUs within the workspace (e.g., the workspace 110) to halt motion. In some embodiments, the stoppage of all (or some) of the MDUs may continue until an override command is provided. It may be required that the override command be initiated from a particular interface (not depicted). By way of example, an override interface may be situated at any suitable location of the workspace 110 and may include any suitable interface element such as a graphical interface, a mechanical key hole, a button, a keyboard, or the like. Each MDU of the workspace may remain stationary until the override command is initiated from said interface.

In operation, an operator may sign in to station computing device 202 to indicate he is ready to receive a task. In some embodiments, the operator may select a task/type of task to be assigned. The management module 102 of FIG. 1 may perform any suitable method for assigning a task to the operator and/or workstation 200 according to the current tasks available within the workspace 110.

Upon powering on the station computing device 202, signing on, authenticating the operator, or at any suitable time, the station computing device 202 may communicate information (e.g., usage data such as an operator identifier, an indicator that the workstation 200 is being used, etc.) to the controller device 204 indicating that the station is in use. In some embodiments, the controller device 204 may transition to, or operate in, a restricted state in response to receiving the usage data (and/or upon powering on the station computing device 202). In other embodiments, the usage data will not cause a transition if the controller device 204 is already operating in restricted state. In response to transitioning to a restricted state, or at any suitable time while operating in a restricted state, the controller device 204 may be configured to cause an indicator device (e.g., the indicator device 222 of FIG. 2, located within the workstation 200) to indicate that access to the interaction area 208 is restricted (and/or that the controller device 204 is operating in a restricted state). By way of example, the controller device 204 may cause the indicator device 222 to display yellow light at least one area of the indicator device 222 (e.g., at a top area and a bottom area) according to a predetermined pattern and/or scheme. Upon transition to, or while operating in, a restricted state, the controller device 204 may be configured to cause access to the interaction area 208 to be restricted. By way of example, the controller device 204 may transmit data to an access device (not depicted) that causes the gate 404 to be locked and/or immoveable. In some embodiments, the controller device 204 may cause the access device to operate a motor to close the gate 404.

In at least one embodiment, while operating in the restricted state, the controller device 204 may be configured to monitor for breaches of the light curtain and/or for objects within the interaction area 208. By way of example, the controller device 204 may receive sensor data from one or more emitters and/or receivers generating a light curtain at an access point (e.g., the access point 210 of FIG. 2) of the interaction area 208. The controller device 204 may be configured to receive sensor data indicating that at least one light receiver of the light curtain has failed to detect a light emission from its corresponding light emitter. Upon receiving sensor data indicating a breach of the light curtain, the controller device 204 may be configured to monitor for additional breaches and/or objects within the interaction area 206 (e.g., utilizing a sensor positioned at location 214). In some embodiments, the controller device 204 may determine that an activity (e.g., delivery of a storage container) within the interaction area 208 has concluded based at least in part on any suitable combination of: detecting a second breach of the light curtain (e.g., within a predetermined time period) after the detection of the first breach, detecting a particular order/sequence of a breach of the light curtain and object detection by an additional sensor (e.g., located at location 214), determining that a breached area of the first breach was bigger than a breached area of the second breach (e.g., indicating a container was left in the interaction area), determining an object is located within the interaction area utilizing sensor data of one or more sensors configured to detect objects within the interaction area, determining that a change in sensor data and/or the light curtain was last detected at least a predetermined threshold period of time in the past. Based at least in part on any suitable combination of the determinations discussed above, the controller device 204 may be configured to transition to a ready state.

In response to transitioning to a ready state, or at any suitable time, the controller device 204 may be configured to cause an indicator device (e.g., the indicator device 222 of FIG. 2, located within the workstation 200) to indicate that access to the interaction area 208 is ready for access (and/or that the controller device 204 is operating in a ready state). By way of example, the controller device 204 may cause the indicator device 222 to display green light at least one area of the indicator device 222 (e.g., at a middle area) according to a predetermined pattern and/or scheme.

Upon transition to, or while operating in, a ready state, the controller device 204 may be configured to cause access to the interaction area 208 to be enabled. By way of example, the controller device 204 may transmit data to an access device (not depicted) that causes the gate 404 to be unlocked and/or moveable. In some embodiments, the controller device 204 may cause the access device to operate a motor to open the gate 404. In still further examples, the controller device 204 may directly control the lock and/or motor associated with the gate 404.

In at least one embodiment, while operating in the restricted state, the controller device 204 may be configured to monitor for breaches of the light curtain. Upon detecting a breach of the light curtain during the ready state, the controller device 204 may cause the indicator device 222 to display red light within at least one area of the indicator device (e.g., the top area, the middle area, and the bottom area, or any suitable combination of the above) according to any suitable predetermined pattern and/or scheme. In some embodiments, the red light may be displayed as a flashing light according to the predetermined pattern and/or scheme.

In some embodiments, upon transitioning to or operating in a breach state, the controller device 204 may perform a remedial action that may include transmitting, via a short-range wireless signal (e.g., a radio signal), a command to halt motion of one or more mobile drive units within a threshold distance of the controller device 204. By way of example, the short-range wireless signal may be transmitted at a frequency of 120-130 MHz having a limited range within which the signal may be received. Accordingly, one or more mobile drive units within a threshold distance of the controller device 204 may receive the signal. In some embodiments, reception of the signal alone (without additional transmitted data) may cause the one or more mobile drive units to halt motion and/or task performance. In some embodiments, the controller device 204 may be configured to transmit the signal at any suitable periodicity while it operates in the breach state. The mobile drive units (e.g., the mobile drive units 104 of FIG. 1) may be configured to remain stationary so long as the signal is being received (or has been received within a threshold time period). In some embodiments, once the signal has stopped being transmitted, the mobile drive units may be configured to wait a period of time (e.g., 5 seconds since last reception) before resuming their corresponding tasks.

Subsequent to transitioning to a breach state, or at any suitable time, the controller device 204 may receive an indication from a user interface of the controller device 204 (e.g., the reset interface 220 of FIG. 2 which may include one or more input devices such as a button, a keyboard, a mechanical key, etc.) and/or the station computing device 202 indicating a reset request. In some embodiments, an operator (or another authorized user such as a manager) may utilize the station computing device 202 and/or a user interface of the controller device 204 (e.g., reset interface 220) to start the controller device 204 and/or reset the controller device 204 to recover from a breach state. As a non-limiting example, a reset request may be submitted when the operator inserts and turns a key using a key hole of reset interface 220 and subsequently pushes a button of the reset interface 220. Upon receiving a start and/or reset request, the controller device 204 may transition to another state (e.g., a ready state, a restricted state) and access to the interaction area and/or the indication provided by the indicator device 222 may be updated accordingly. If the controller device 204 transitions from a breach state to another state, the controller device 204 may be configured to halt transmission of the radio signal.

In at least one embodiment, while the controller device 204 operates in the "ready" state, the access point 402 may be utilized any suitable number of times and movement inferred and/or objects detected within the interaction area 208 may be ignored. When his task is complete and the operator no longer requires access to the storage container, he may request that the storage container be moved out of the interaction area 208. In some embodiments, the storage container may have been left by an MDU, while in other embodiments, the MDU may be instructed to remain with the storage container. In some embodiments, the operator may submit a release request via a physical button of the workstation 200 (e.g., release device 412) and/or a user interface provided by the station computing device 202. A release request may be transmitted from the station computing device 202 to the controller device 204.

Upon receiving the release request, the controller device 204 may analyze current sensor data provided by the emitters/receivers of the light curtain to identify whether or not an object is currently breaching the light curtain. If no object is breaching the light curtain, the controller device 204 may transition to a restricted state, cause the restricted state to be indicated by the indicator device 222, cause the gate 404 to be closed and/or locked, and transmit a message back to the station computing device 202 granting the release request. Upon receiving a grant to its release request, the station computing device 202 may be configured to transmit data to the management module 102 requesting that the mobile drive unit/storage container be moved (and/or reporting completion of a task). Alternatively, the controller device 204 may transmit data directly to the management module 102 requesting that the mobile drive unit/storage container be moved (and/or reporting completion of a task). Upon receipt of such data, the management module 102 may instruct a mobile drive unit to move and/or to move a container out of the interaction area that, upon receipt by the mobile drive unit, cause the mobile drive unit to perform as instructed.

If the controller device 204 determines, in response to a release request, that the light curtain is currently being breached and/or the gate 404 is not closed and/or locked, the controller device 204 may wait a predetermined period of time (e.g., 3 seconds, 5 seconds, etc.) to determine if the breach is resolved and/or gate is closed and/or locked. If sensor data is received within that time period indicating that there are no object currently breaching the light curtain and/or the gate is closed and/or locked, the controller device 204 may grant the release request as described above. In some embodiments, the controller device 204 may indicate (e.g., via the indicator device 222, via the station computing device 202, etc.) that a release request has been received but an object is currently breaching the light curtain in order to notify the user that the object(s) must be moved. Similarly, if the controller device 204 determined that the gate isn't closed and/or locked, the user may be notified via any suitable visual and/or audible interface of the condition. In some embodiments, if the breach is not resolved and/or the gate is not closed and/or locked within the time period, the controller device 204 may deny the release request and transmit an indication of the denial to the station computing device 202. Upon receiving the denial of the release request, the station computing device 202 may cause a mobile drive unit to be restricted from moving in or out of the interaction area 208. For example, the station computing device 202 may be configured to transmit data to the management module 102 to cause the management module 102 to restrict a mobile drive unit from moving in or out of the interaction area 208. In some embodiments, the station computing device 202 itself may perform the restriction by failing to request that the mobile drive unit be moved until such time as it receives a grant to a release request for the mobile drive unit. Upon receiving a denial, the station computing device 202 may transmit another request in response to additional user input and/or the station computing device 202 may transmit one or more additional release requests at any suitable frequency (e.g., every 10 seconds) any suitable number of times (e.g., 5 times). The station computing device 202 may potentially continue to transmit release request until such time as it receives a grant to its request.

Figure 5:
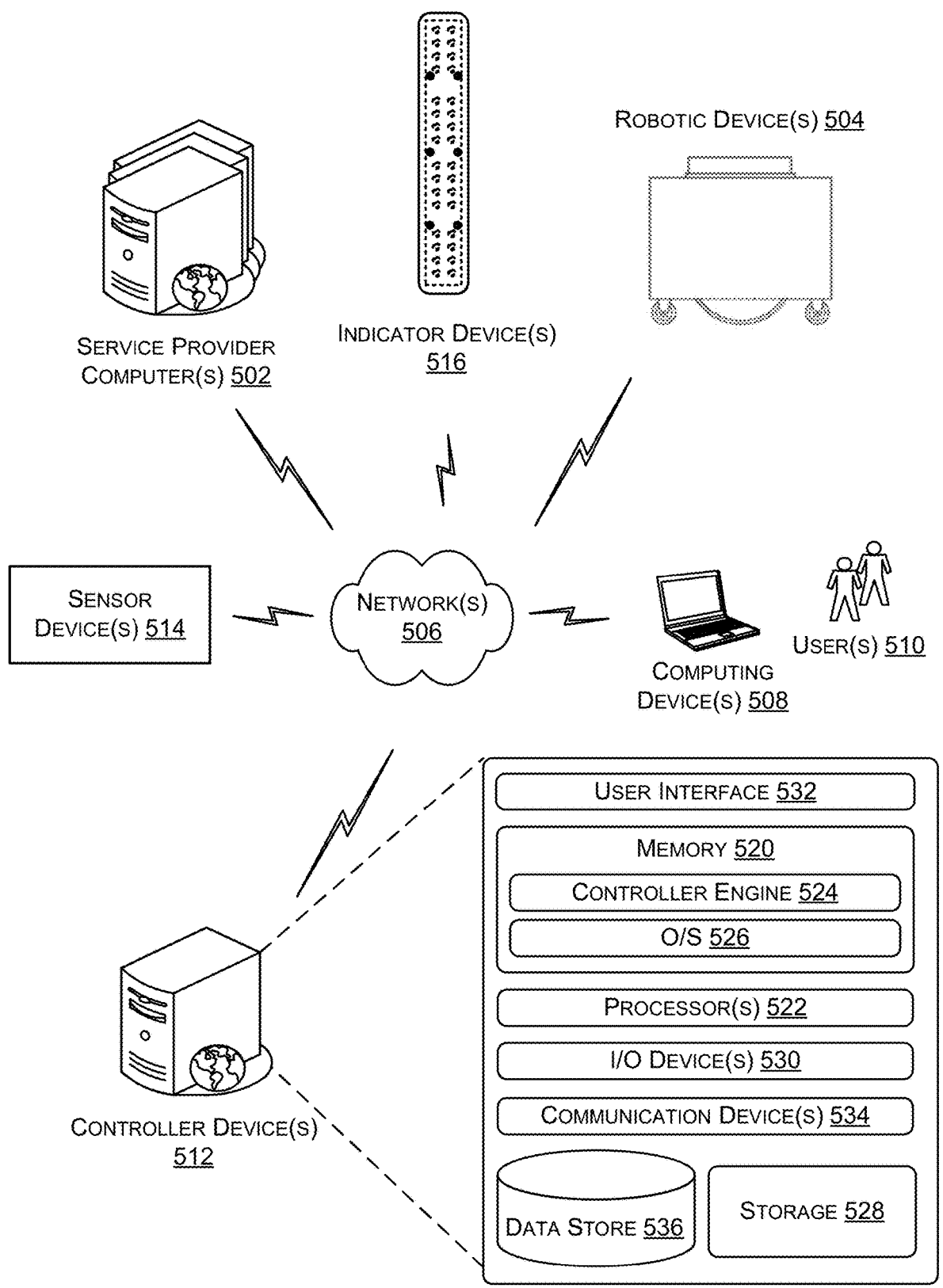
FIG. 5 is an example system architecture for implementing aspects of the inventory system, in accordance with at least one embodiment.

FIG. 5 is an example system architecture for system 500 for implementing aspect of the system of FIG. 1, in accordance with at least one embodiment. The system 500 may include service provider computer(s) 502. The service provider computer(s) 502 may support an electronic marketplace (not shown) and interface with purchase and delivery services of the electronic marketplace. The management module 102 of FIG. 1, operating as part of the service provider computer(s) 502, may coordinate receiving, storing, packaging, and shipping of items in a workspace (e.g., the workspace 110 of FIG. 1) operated by, or on behalf of, the electronic marketplace provider. In some examples, the service provider computer(s) 502 may be a stand-alone service operated on its own or in connection with an electronic marketplace. In either example, the service provider computer(s) 502 may be in communication with the robotic device(s) 504 (e.g., the mobile drive units 104 of FIG. 1), and/or the computing device(s) 508, and/or the controller device(s) 512 via one or more network(s) 506 (hereinafter, "the network 506"). The network 506 may include any one or a combination of many different types of networks, such as cable networks, the Internet, wireless networks, cellular networks, radio networks, and other private and/or public networks. The functionality provided by the management module 102 discussed above with respect to FIG. 1 may be, at least in part, provided by a management module operating on the service provider computer(s) 502.

Computing device(s) 508 (e.g., station computing devices associated with a workstations of the workstations 108 of FIG. 1, the station computing device 202 of FIG. 2, etc.) may also be in communication with the service provider computer(s) 502 via the network 506. The computing device(s) 508 may be operable by one or more users 510 (hereinafter, "the users 510," operators of workstations 108) to access the service provider computer(s) 502 via the network 506. The computing device(s) 508 may be any suitable device (e.g., portable or non-portable) capable of communicating with the network 506. For example, the computing device(s) 508 may be any suitable computing device such as, but not limited to, a mobile phone, a smart phone, a personal digital assistant (PDA), a laptop computer, a thin-client device, a tablet PC, a desktop computer, a scanner, or other computing device. The computing device(s) 508 may include one or more processors, memory, I/O devices, one or more data stores, additional storage, and an operating system. The functionality provided by the management module 102 discussed above with respect to FIG. 1 may be, at least in part, provided by a management module operating on computing device(s) 508.

Turning now to the details of the robotic device(s) 504. The robotic device(s) 504 may be examples of the mobile drive units 104 of FIG. 1. In some embodiments, the robotic device(s) 504 may include an onboard computer including at least one memory and one or more processing units. The processor(s) may be implemented as appropriate in hardware, computer-executable instructions, software, firmware, or combinations thereof. Computer-executable instruction, software or firmware implementations of the processor(s) may include computer-executable or machine-executable instructions written in any suitable programming language to perform the various functions described. The memory may include more than one memory and may be distributed throughout the onboard computer. The memory may store program instructions that are loadable and executable on the processor(s), as well as data generated during the execution of these programs. The functionality provided by the management module 102 discussed above with respect to FIG. 1 may be, at least in part, provided by a management module operating on the robotic device(s) 504.

Depending on the configuration and type of memory of the robotic device(s) 504 the memory may be volatile (such as random access memory (RAM)) and/or non-volatile (such as read-only memory (ROM), flash memory, or other memory). The memory may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM. Turning to the contents of the memory in more detail, the memory may include an operating system and one or more application programs, modules or services for implementing the features disclosed herein.

In some examples, the onboard computer of the robotic device(s) 504 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices.

The memory and the additional storage, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer. The modules of the onboard computer of the robotic device(s) 504 may include one or more components. The onboard computer of the robotic device(s) 504 may also include input/output (I/O) device(s) and/or ports, such as for enabling connection with a keyboard, a mouse, a pen, a voice input device, a touch input device, a display, speakers, a printer, or other I/O device. The robotic device(s) 504 may include any suitable communication devices (e.g., a radio signal receiver for receiving short range transmission from the controller device(s) 512).

The onboard computer of the robotic device(s) 504 may also include one or more data stores. The data stores may include one or more databases, data structures, or the like for storing and/or retaining information associated with the robotic device(s) 504 such as any suitable data related to task assignments, instructions, and/or task performance information.

The service provider computer(s) 502, perhaps arranged in a cluster of servers or as a server farm, may host web service applications. These servers may be configured to host a website (or combination of websites). In at least one example, the service provider computer(s) 502 may be configured to manage the robotic devices 504 as part of an inventory system (e.g., the inventory system 100). The service provider computer(s) 502 may include at least one memory and one or more processing units. The processor(s) may be implemented as appropriate in hardware, computer-executable instructions, software, firmware, or combinations thereof. Computer-executable instruction, software or firmware implementations of the processor(s) may include computer-executable or machine-executable instructions written in any suitable programming language to perform the various functions described.

The memory may include more than one memory and may be distributed throughout the service provider computer(s) 502. The memory may store program instructions (e.g., management module 102) that are loadable and executable on the processor(s), as well as data generated during the execution of these programs. Depending on the configuration and type of memory including the management module 102 of FIG. 1, the memory may be volatile (such as random access memory (RAM)) and/or non-volatile (such as read-only memory (ROM), flash memory, or other memory). The service provider computer(s) 502 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

The memory of the service provider computer(s) may include an operating system and one or more application programs, modules or services for implementing the features disclosed herein including at least the management module 102. The management module 102, in some examples, may function at least in part at the robotic device(s) 504. For example, when the robotic device(s) 504 are in network communication with the service provider computer(s) 502, the robotic device(s) 504 may receive at least some instructions from the service provider computer(s) 502. In some examples, the robotic device(s) 504 may individually execute the management module 102 (e.g., that implement the features described with respect to task assignment, task performance, and/or peer-to-peer communication features) to operate independent of the service provider computer(s) 502.

In some examples, the service provider computer(s) 502 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices.

The memory and the additional storage, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computer(s) 502. The modules of the service provider computer(s) 502 may include one or more components. The service provider computer(s) 502 may also include input/output (I/O) device(s) and/or ports, such as for enabling connection with a keyboard, a mouse, a pen, a voice input device, a touch input device, a display, speakers, a printer, or other I/O device.

In some examples, the service provider computer(s) 502 may include a user interface. The user interface may be utilized by an operator, or other authorized user to access portions of the service provider computer(s) 502. In some examples, the user interface may include a graphical user interface, web-based applications, programmatic interfaces such as application programming interfaces (APIs), or other user interface configurations. The service provider computer(s) 502 may also include a data store. The data store may include one or more databases, data structures, or the like for storing and/or retaining information associated with the service provider computer(s) 502.

The sensor device(s) 514 may include any suitable number of sensors (e.g., time of flight sensors) and/or light emitters/receivers (e.g., infra-red emitters/receivers). In some embodiments, the sensor device(s) 514 may be situated at a workstation associated with the controller device(s) 512. For example, a number of sensors may be positioned within an interaction area of the workspace associated with the controller device(s) 512. The sensor device(s) 514 may include any suitable number of light emitters and corresponding receivers configured to produce a light curtain (e.g., light curtain 218 of FIG. 2) that spans some portion of an access point of the interaction area. In some embodiments, the sensor device(s) 514 may communicate with the controller device(s) 512 via any suitable wired and/or wireless communications protocol (e.g., via the network(s) 506).

The controller device(s) 512 may be an example of the controller device(s) 112 of FIG. 1 and controller device 204 of FIG. 2. In some embodiments, the controller device(s) 512 may include at least one memory 520 and one or more processing units (or processor(s)) 522. The processor(s) 522 may be implemented as appropriate in hardware, computer-executable instructions, software, firmware, or combinations thereof. Computer-executable instruction, software or firmware implementations of the processor(s) 522 may include computer-executable or machine-executable instructions written in any suitable programming language to perform the various functions described. The memory 520 may include more than one memory and may be distributed throughout the onboard computer. The memory 520 may store program instructions (e.g. the controller engine 524) that are loadable and executable on the processor(s) 522, as well as data generated during the execution of these programs. The controller engine 524 may store instructions that, when executed by the processor(s) 522, provide the functionality discussed herein of the controller device(s) 512.

Depending on the configuration and type of memory, the memory 520 may be volatile (such as random access memory (RAM)) and/or non-volatile (such as read-only memory (ROM), flash memory, or other memory). The memory 520 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 520 may include multiple different types of memory, such as static random access memory (SRAM), dynamic random access memory (DRAM), or ROM. Turning to the contents of the memory 520 in more detail, the memory 520 may include an operating system 526 and one or more application programs, modules or services for implementing the features disclosed herein including at least the controller engine 524.

In some examples, the controller device(s) 512 may also include additional storage 528, which may include removable storage and/or non-removable storage. The additional storage 528 may include, but is not limited to, magnetic storage, optical disks, and/or tape storage. The disk drives and their associated computer-readable media may provide non-volatile storage of computer-readable instructions, data structures, program modules, and other data for the computing devices.

The memory 520 and the additional storage 528, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the controller device(s) 512. The modules of the controller device(s) 512 may include one or more components. The controller device(s) 512 may also include input/output (I/O) device(s) 530 and/or ports, such as for enabling connection with a keyboard, a mouse, a pen, a voice input device, a touch input device, a display, speakers, a printer, or other I/O device. The I/O device(s) 530 may enable communication with the other systems of the robotic devices 509.

In some examples, the controller device(s) 512 may include a user interface 532. The user interface 532 may be utilized by an operator, or other authorized user to access portions of the controller device(s) 512. In some examples, the user interface 532 may include a graphical user interface, web-based applications, programmatic interfaces such as application programming interfaces (APIs), or other user interface configurations. The controller device(s) 512 may also include data store 536. The data store may include one or more databases, data structures, or the like for storing and/or retaining information associated with the controller device(s) 512.

In some examples, the controller device(s) 512 may include communication device(s) 534. The communication device(s) 534 may include any suitable transmitter and/or receiver device configured to transmit and receive data wirelessly via network(s) 506 to service provider computer(s) 502, sensor device(s) 514, robotic device(s) 504, and/or computing device(s) 508. The communication device(s) 534 may include any suitable short-range wireless communications transmitter. In some embodiments, the robotic device(s) 504 may be configured with a receiver configured to receive data via a corresponding wireless communications receiver.

Figure 6:
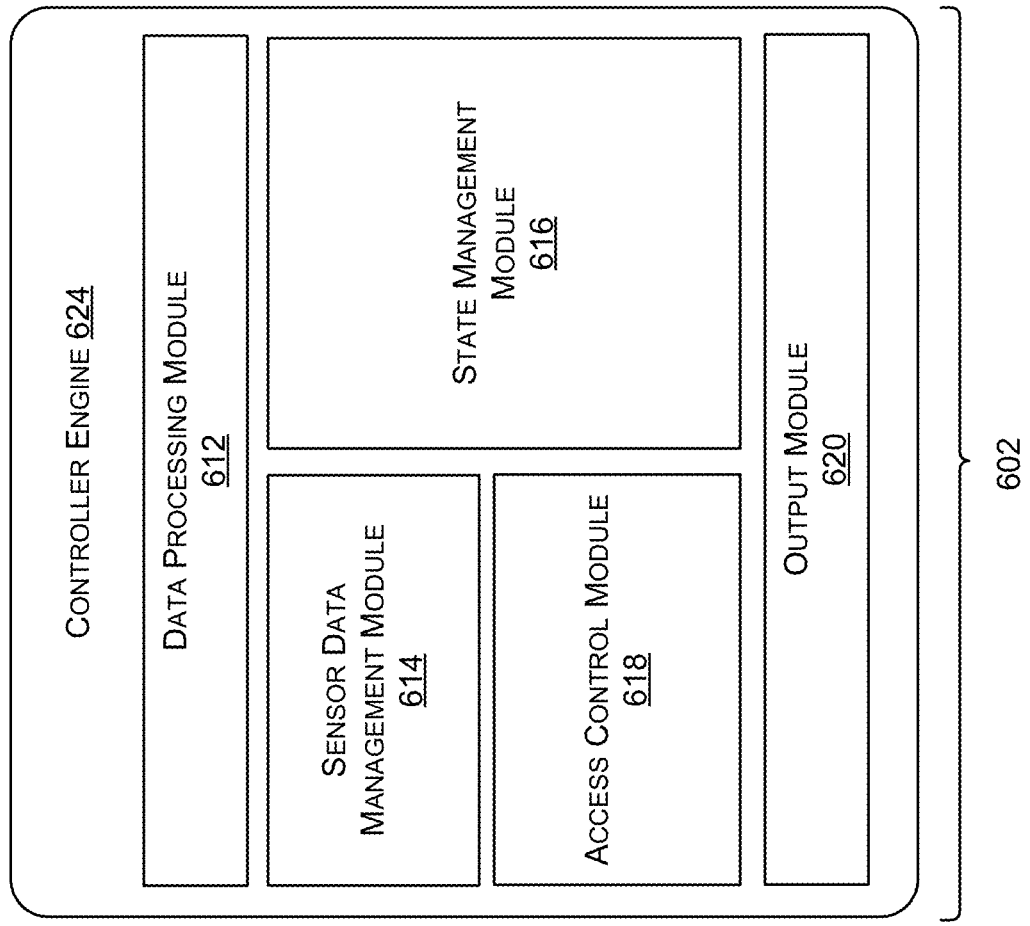
FIG. 6 illustrates in greater detail the components of an example controller engine that may be utilized in particular embodiments of the inventory system shown in FIG. 1.

FIG. 6 illustrates in greater detail the components of a particular embodiment of a controller engine 524 of FIG. 5, according to at least one embodiments. As shown, the example embodiment includes a data processing module 612, a sensor data management module 614, a state management module 616, access control module 618, and an output module 620. In general, the controller engine 524 may include any appropriate combination of hardware and/or software suitable to provide the described functionality.

In at least one embodiment, the data processing module 612 may be configured to receive any suitable data from any suitable source. By way of example, the data processing module 612 may be configured to receive any suitable data from a station computing device (e.g., an example of the computing device(s) 508 of FIG. 5), the service provider computer(s) 502, the robotic device(s) 504, the sensor device(s) 514, and the like. In some embodiments, the data processing module 612 may receive an indication that a workstation associated with the controller engine 524 (e.g., a workstation at which the controller device(s) 512 are located) is in use. The controller engine 524 may receive requests (e.g., from the computing device(s) 508) for state information. In some embodiments, the data processing module 612 may receive sensor data from one or more sensors of a workstation (e.g., the sensor device(s) 514 of FIG. 5). In some embodiments, this sensor data may include an indication that an object is detect by one or more sensors and/or that one or more light receivers of a light curtain did or did not receive a light transmitted by a corresponding light emitter. At any suitable time, the data processing module 612 may receive a start request and/or a reset request and/or a release request associated with enabling a mobile drive unit to leave the interaction area. A start and/or reset request may, in some embodiments, be initiated manually (e.g., by depressing a physical button and/or turning a mechanical key) or electronically (e.g., via a user interface of the computing device(s) 508). The release request may be received from the computing device(s) 508 or any suitable component of the system 500 of FIG. 5 (an example of the inventory system 100 of FIG. 1). The data processing module 612 may be configured to communicate any suitable received data to any suitable combination of the remaining modules 602. By way of example, the data processing module 612 may forward the received data and/or otherwise stimulate the functionality of the sensor data management module 614 upon receipt of sensor data. In response to a request for state information and/or the receipt of a start and/or reset request (e.g., an override indication/request), the data processing module 612 may forward the received data and/or otherwise stimulate the functionality of the state management module 616 and/or the access control module 618.

In at least one embodiments, the sensor data management module 614 may be configured to receive data from the data processing module 612. By way of example, sensor data received by the data processing module 612 may be forwarded to the sensor data management module 614 for processing. In some embodiments, the sensor data from one or more sensors located near or within an interaction area of a workspace may indicate the presence of an object within the interaction area. In some embodiments, motion within the interaction area may be inferred by the sensor data management module 614 based at least in part on an order in which the sensor(s) detect an object and/or an order in which a breach is detected at the light curtain and an object is detected by one or more sensor(s). In some embodiments, the sensor data may additionally or alternatively include data indicating that one or more light receivers failed to receive a light (e.g., an infra-red light) from a corresponding light emitter. The light receivers and emitters may generate a light curtain (e.g., the light curtains depicted in FIG. 2) at an access point of an interaction area monitored by the controller engine 524. In at least some embodiments, the sensor data management module 614 may receive an indication (e.g., from the data processing module 612) that a release request has been received corresponding to a request for a mobile drive unit to leave the interaction area. In some embodiments, the sensor data management module 614 may analyze sensor data over a time period (e.g., a 3 second time period, a 5 second time period, etc.) to identify whether an object has breached the light curtain, or if a previously breaching object has been moved. In some embodiments, the sensor data management module 614 may be configured to stimulate the functionality of the output module 620 and/or the state management module 616.

The sensor data management module 614 may analyze the sensor data to identify that a mobile drive unit and/or a storage container are approaching the interaction area. In some embodiments, the sensor data management module 614 may be configured to identify when a mobile drive unit (or an object) is entering and/or exiting the interaction area by identifying that a number of sensors configured to monitor the interaction area have sensed an object in a particular, predetermined sequence. By way of example, the sensor data management module 614 may be configured to identify that a mobile drive unit/storage container is entering an interaction area only when the two (or more) sensors detect an object according to a particular sequence. In some embodiments, the light curtain may be considered a first sensor, and an additional sensor configured to detect an object within the interaction area may be considered a second sensor. By physical constraint of the system, the mobile drive units may be configured to enter an interaction area from a particular direction (e.g., through a particular access point). Similarly, the sensor data management module 614 may be configured to identify when a mobile drive unit/storage container is exiting the interaction area when the sensors and/or the light curtain detect an object according to the opposite sequence (or another predetermined sequence). In some embodiments, the sensor data management module 614 may determine an activity (e.g., delivery of a container, positioning of a mobile drive unit within the interaction area) has concluded. For example, the sensor data management module 614 may determine that a threshold period of time has elapsed since a last change in sensor data and/or the light curtain was detected. The sensor data management module 614 may be configured to stimulate the functionality of the state management module 616 (e.g., by sending data to the state management module 616 indicating a condition associated with the interaction area (e.g., an object entering, an object exiting, unknown motion, activity concluded, etc.).

At any suitable time, the sensor data management module 614 may be configured to analyze the sensor data of a light curtain (e.g., a light curtain generated by one or more light emitters/receivers) to determine whether or not one or more light receivers failed to receive a corresponding light emission (e.g., infra-red light emission) from a corresponding light emitter. If the sensor data management module 614 determines that the sensor data indicates that one or more light receivers failed to receive its corresponding light emission emitted by its corresponding light emitter, the sensor data management module 614 may be configured to stimulate the functionality of the state management module

616 by providing data indicative of a breach to the state management module 616. As yet another, example, the sensor data management module 614 may be configured to determine that a first breach indicated a larger breach area (e.g., generally corresponding to an area of side of a MDU and a side of a storage container) and a subsequent breach indicated a relatively smaller breach area (e.g., an area generally corresponding to a side of an MDU) indicates that an object (e.g., an MDU) has entered, deposited another object (e.g., a container) and has exited the interaction area. The sensor data management module 614 may be configured to utilize current sensor data and/or historical sensor data (e.g., stored by the sensor data management module 614) to identify whether or not an object is currently located at the interaction area and/or whether or not a breach is currently occurring and/or when a breach last occurred.

In some embodiments, the sensor data management module 614 may determine an object is entering and/or exiting the interaction area based at least in part on determining an order with which various sensors (e.g., the light curtain and one or more additional sensors) detect an object. Thus, sensor data indicating a breach of the light curtain 218 followed by sensor data (e.g., from a sensor located at 214 of FIG. 2) indicating an object located within the interaction area may cause the sensor data management module 614 to determine that an object has entered the interaction area. Processing sensor data indicating the object detected by the sensor at location 214 is no longer detected, followed by sensor data indicating a second breach of the light curtain may cause the sensor data management module 614 to determine an object has exited the interaction area.

In at least one embodiments, the state management module 616 may be configured to manage an operational state of the controller device(s) 512. In some embodiments, the controller device(s) 512 may operate in three states (although more or fewer states are possible): "restricted," "ready," and "breach."

While transitioning to a restricted state, or at any suitable time, the state management module 616 may be configured to transmit data to the access control module 618 to cause the access control module 618 to restrict access to the interaction area via one or more access points. While operating in the restricted state, the state management module 616 may be configured to ignore breaches in a light curtain. By way of example, the state management module 616 may be configured to transition to and/or operate in a restricted state when an indication is received (e.g., via the data processing module 612) that the workstation is in use (or that the workstation is no longer in use), upon powering on the workstation (or the controller device(s) 512). While operating in the restricted state, the state management module 616 may receive an indication (e.g., from the sensor data management module 614) that an object is entering or exiting the interaction area. By way of example, the sensor data may indicate, among other things, that an object (e.g., a mobile drive unit/storage container) has entered the interaction area (e.g., as indicated from a breach in the light curtain 218). In some embodiments, the state management module 616 may be configured to wait a predetermined period of time since a time at which a change in the sensor data collected within the interaction area was detected (e.g., indicating the blocking object has not moved for a predetermined period of time). As another example, the state management module 616 may be configured to receive data (e.g., from the sensor data management module 614) indicating an object has exited the interaction area (e.g., as would be the case when an MDU exits the area).

The state management module 616 may be configured to transition to a "ready" state given one or more conditions (e.g., upon receiving data from the sensor data management module 614 that indicates an object such as an MDU has entered and exited the interaction area according to the analysis above). While transitioning to a ready state, or at any suitable time, the state management module 616 may be configured to transmit data to the access control module 618 to cause the access control module 618 to enable access to the interaction area via one or more access points (e.g., open a gate/door at the access point, unlock a gate/door at the access point, remove a physical barrier previously restricting access to the interaction area via the access point, etc.). In some embodiments, the state management module 616, having detected (e.g., based on data provided by the sensor data management module 614) a first breach occurring during a restricted state, may transition to a ready state immediately following detection of a second breach (or immediately following the conclusion of a second breach). In some embodiments, prior to transitioning to a ready state, the state management module 616 may determine whether the sensor data of the first breach indicated a breach area larger than the area indicated by the sensor data of the second breach. If the first breach area is bigger than the second breach area, the state management module 616 may be configured to transmit to a ready state.

As another example, the state management module 616 may transition to a ready state based at least in part on determining that an object is located in the interaction area and that a change in sensor data (and/or the light curtain) has not occurred for a predetermined period of time. As another example, the state management module 616 may transition to a ready state based at least in part on determining that an object is located within the interaction area after a first breach, and a second breach has occurred in a predetermined period of time since the first breach. The transition may further be based at least in part on determining that a chance in sensor data and/or the light curtain has not occurred within a predetermined period of time since the last change in sensor data or light curtain breach was detected. As yet another example, the state management module 616 may be configured to transition to a ready state based at least in part on determining (based on an order by which multiple sensors of the interaction sensed motion) that an object entered and then exited the interaction area. Upon transitioning to any suitable state, the state management module 616 may update any suitable number of global variables and/or store any suitable data for maintaining a record of a current and/or historical operating state. As yet another example, the state management module 616 may be configured to determine that data received from the sensor data management module 614 indicates any of the conditions discussed above.

The state management module 616 may further operate in a "breach" state. By way of example, while the state management module 616 is operating in ready state, it may receive (e.g., from the sensor data management module 614 and/or the data processing module 612) indication that the light curtain has been breached and/or a request to transition to a "breach" state (e.g., from a stop request device). In response, the state management module 616 may transition to a breach state. In some embodiments, while operating in the breach state, the state management module 616 may be configured to cause the output module 620 to transmit a short-range wireless signal (e.g., a radio signal). This signal may be a broadcasted signal operating at a predetermined frequency (e.g., 120-130 MHz). In some embodiments, the state management module 616 may be configured to maintain transmission of the broadcasted signal so long as the state management module 616 operates in the breach state.

It should be appreciated that the state management module 616 may be configured to transmit data to the output module 620 during, or subsequent to transitioning to a state, to cause an indicator device (e.g., the indicator device of FIG. 4) to present an indication of the current operating state. By way of example, upon transitioning to a restricted state, the state management module 616 may cause the output module 620 to transmit data to the indicator device to cause the indicator device to present (e.g., visually or audibly) a pattern and/or sound indicative of operation in the restricted state. For example, the indicator device could emit yellow light from a top area and a bottom area of the indicator device. In some embodiments, upon transitioning to an ready state, the state management module 616 may cause the output module 620 to transmit data to the indicator device to cause the indicator device to present (e.g., visually or audibly) a pattern and/or sound indicative of operation in the ready state. For example, the indicator device could emit green light from a middle area of the indicator device. In some embodiments, upon transitioning to a breach state, the state management module 616 may cause the output module 620 to transmit data to the indicator device to cause the indicator device to present (e.g., visually or audibly) a pattern and/or sound indicative of operation in the breach state. For example, the indicator device could emit red light one or more areas (e.g., 3) of the indicator device. In some embodiments, the indicator device may be configured to emit a solid and/or blinking light corresponding to receiving an indication of a particular operation state.

In some embodiments, the state management module 616 may be configured to receive an indication that a start and/or reset request has been received (e.g., by the data processing module 612). Upon receiving this indication, or at any suitable time, the state management module 616 may be configured to transition to from a breach state to another state (e.g., a restricted state, a ready state, etc.).

In some embodiments, the state management module 616 may be configured to receive a request for state and/or a request to release a mobile drive unit from the interaction area. In response for state information, the state management module 616 may be configured to provide an indication of the current operating state to the output module 620 that in turn may provide the indication of the current state to the requesting device. In some embodiments (e.g., while operating in a ready state), the state management module 616 may receive a request to release a mobile drive unit from the interaction area. In these scenarios, the state management module 616 may determine a current operating state and/or may request data (e.g., sensor data, and indication of whether the light curtain is currently being breached) from the sensor data management module 614. Utilizing the sensor data and/or breach indication, the state management module 616 may determine whether to grant or decline the release request. In some embodiments, if the state management module 616 determines a breach is not currently occurring, it may transition to a restricted state and transmit a message to the requesting device granting the release request. Just prior or subsequent to the release request being granted, the state management module may transmit data to the access control module 618 to cause the access control module 618 to restrict access to the interaction area via one or more access points (e.g., close a gate/door, lock a gate/door, place/cause placement of a physical barrier at the access point, etc.). If a breach is currently occurring, the state management module 616 may be configured to monitor the breach for a period of time (e.g., 3 seconds, 5 seconds, etc.) to determine whether the object breaching the light curtain moves out of the light curtain. If the state management module 616 is able to determine, within the predetermined time period, that the breaching object has moved and the light curtain is no longer being breached, the release request may be granted. Otherwise, the release request may be declined.

In some embodiments, the access control module 618 may be configured to restrict or enable access to the interaction area via one or more access points. By way of example, the access control module 618 may be configured to control a lock on a gate/door of an access point. In some embodiments, the access control module 618 may additionally or alternatively be configured to control one or more motors that control movement of the gate/door itself such that the access control module 618 may cause the gate/door to be opened and/or closed. When the gate/door is open and/or unlocked, access to the interaction area may be enabled via the corresponding access point. When the gate/door is closed and/or locked, access to the interaction area may be restricted such that an object over a particular size (e.g., an operator) may not pass into the interaction area. The functionality of the access control module 618 may be triggered by the state management module 616 based at least in part on the current operating state as determined by the state management module 616. For example, upon receiving an indication of a restricted state, the access control module 618 may be configured to restrict access to the interaction area. Upon receiving an indication of a state of ready or breach, the access control module 618 may be configured to enable access to the interaction area via a corresponding access point.

It should be appreciated that although the modules 702 are discussed as having distinct functionality, it is contemplated that any suitable number of modules 702 may be combined in any suitable manner to provide the functionality described in connection with the controller device(s) 512 of FIG. 6.

Utilizing the techniques described above, the controller engine 524 can ensure that objects over a particular size (e.g., an operator, a package, etc.) enters the interaction area from an access point while conveyance/delivery activities are occurring within the interaction area (e.g., during operations performed by an MDU during delivery of a storage container) via another access point. Additionally, the controller engine 524, utilizing the above described techniques, may ensure that were an object to enter the warehouse floor through the light curtain of an interaction area, nearby mobile drive units would be halted until the breach is resolved.

Figure 7:
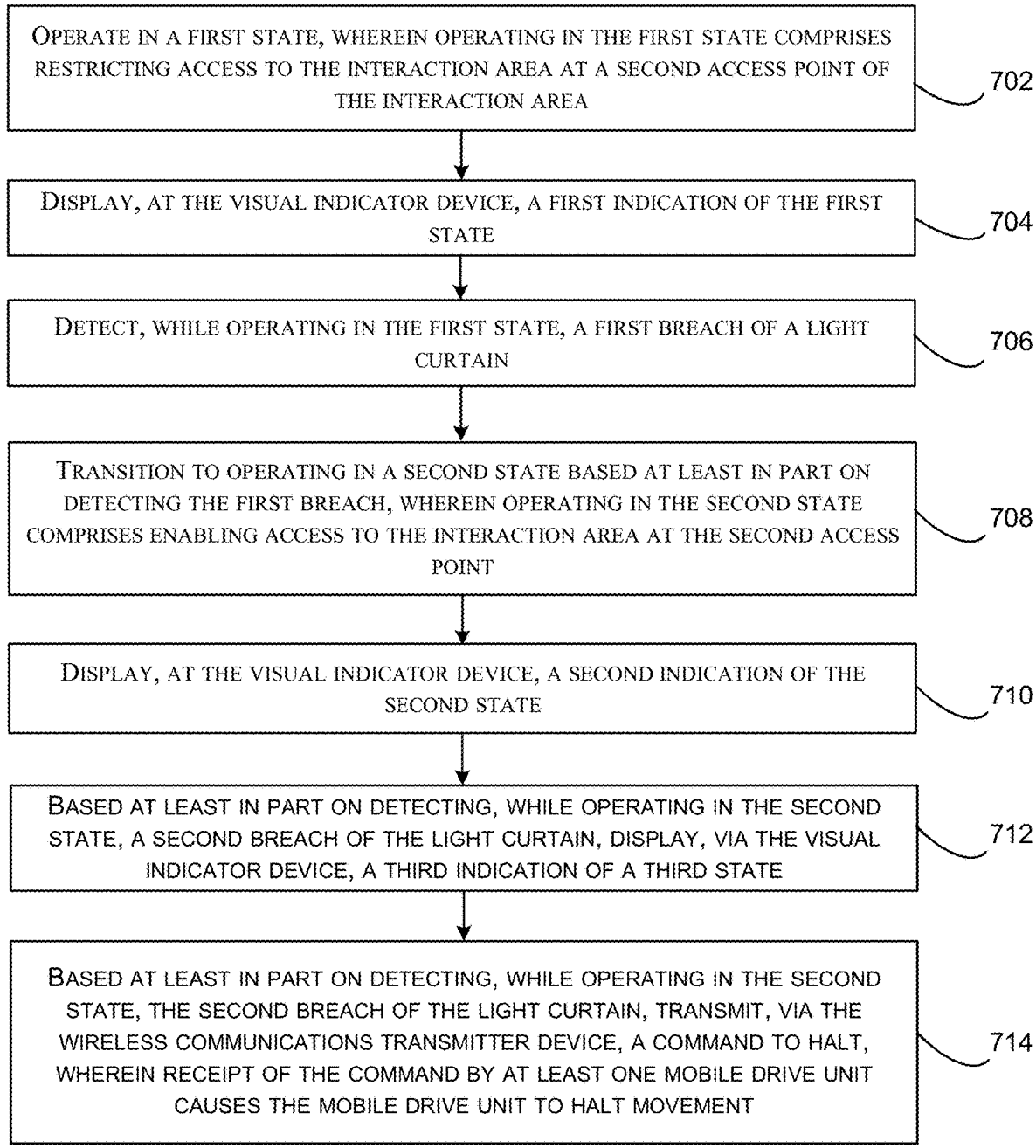
FIG. 7 is a flowchart illustrating an example method for utilizing a controller device to halt movement of one or more mobile drive units, in accordance with at least one embodiment.

FIG. 7 is a flowchart illustrating an example method 700 for utilizing a controller device to halt motion of one or more mobile drive units, in accordance with at least one embodiment. The method 700 may be performed by a system (e.g., the inventory system 100 of FIG. 1, the system 500 of FIG. 5, etc.). The system may comprise any suitable combination of: a mobile drive unit configured to move a storage container within a workspace, a plurality of light emitters and light receivers generating a light curtain at a first access point of an interaction area of the workspace, a visual indicator device, and a controller device. In some embodiments, the controller device may comprise a wireless communications transmitter device, one or more processors, and one or more memories configured with executable instructions that, when executed by the one or more processors, cause the controller device to perform the method 700. It should be appreciated that the steps of method 700 may be performed in any suitable order. In some embodiments, the method 700 may include more or fewer steps then those depicted in FIG. 7.

At 702, the controller device may operate in a first state (e.g., a restricted state). In some embodiments, operating in the first state comprises restricting access to the interaction area (e.g., interaction area 208 of FIGS. 2 and 4) at a second access point of the interaction area (e.g., the access point 212 of FIG. 2).

At 704, the controller device may display (e.g., at the indicator device 222 of FIG. 2) a first indication of the first state. By way of example, the controller device may transmit any suitable data via a wired and/or wireless connection/ protocol to the indicator device to cause the indicator device to display a predetermined light and/or pattern and/or color associated with the first state (e.g., two yellow lighted areas spanning a top area and a bottom area of the indicator device 222).

At 706, the controller device may detect a first breach of the light curtain. By way of example, the controller device 204 may receive from the one or more sensors (e.g., the sensor device(s) 514 of FIG. 5 that provide light curtain 218 of FIG. 2, etc.), sensor data indicating an object is interrupting some portion of the light curtain.

At 708, the controller device may transition to a second state (e.g., a "ready" state) in based at least in part on detecting the first breach. In some embodiments, operating in the second state may comprise enabling access to the interaction area at the second access point. By way of example, the controller device 204 may enable access to the interaction area 208 by opening and/or unlocking gate 404 of FIG. 4.

At 710, the controller device may display at a visual indicator device (e.g., the indicator device 222) a second indication of the second state. By way of example, the controller device may transmit any suitable data via a wired and/or wireless connection/protocol to the visual indicator device to cause the visual indicator device to display a predetermined light and/or pattern and/or color associated with the second state (e.g., a green lighted area spanning a middle area of the indicator device 222).

At 712, based at least in part on detecting, while operating in the first state, a second breach of the light curtain, display, via the visual indicator device a third indication of a third state (e.g., a breach state). By way of example, the controller device 204 may transmit any suitable data via a wired and/or wireless connection/protocol to the visual indicator device to cause the visual indicator device to display a predetermined light and/or pattern and/or color associated with the third state (e.g., a red lighted area spanning the top area, middle area, and bottom area of the indicator device 222).

At 714, based at least in part on detecting, while operating in the first state, a second breach of the light curtain, transmit, via the wireless communications transmitter device to the mobile drive unit, a command to halt. In some embodiments, a transmission of a radio signal at a particular frequency range (e.g., 120-130 MHz) may be considered a command to halt. The controller device may continuously/ periodically transmit such a signal for the duration it operates in the "breach" state." In some embodiments, receipt of the command by the mobile drive unit may cause the mobile drive unit to halt movement. In some embodiments, the mobile drive unit may not resume motion until they have stopped receiving the halt command/signal. In some embodiments, the mobile drive units may be configured to wait some period of time (e.g., 5 seconds) from last receiving the halt command/signal before resuming operations.

Figure 8:
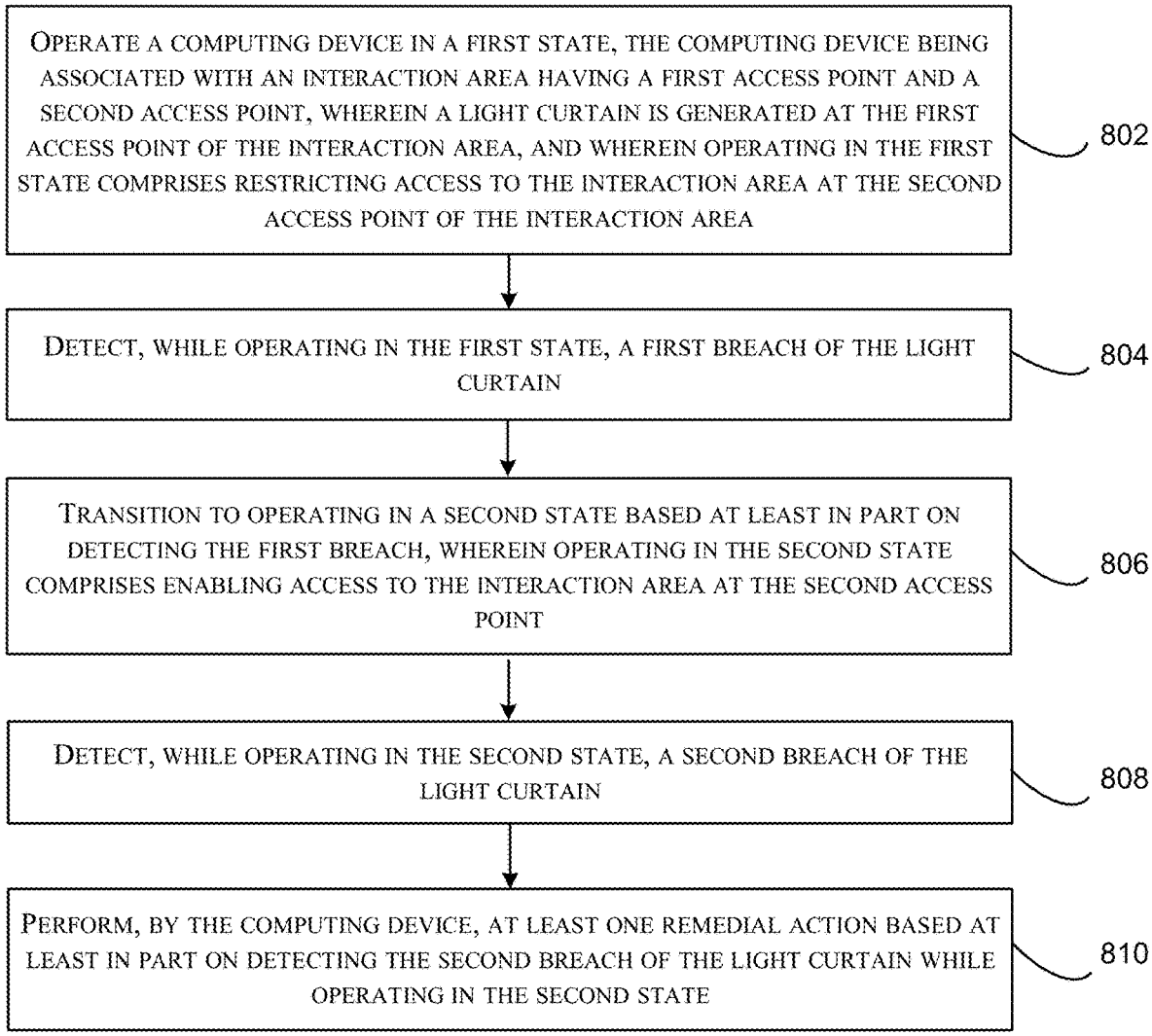
FIG. 8 is a flowchart illustrating an example method for utilizing a controller device to perform at least one remedial action, in accordance with at least one embodiment.

FIG. 8 is a flowchart illustrating an example method 800 for utilizing a controller device (e.g., the controller device 112, 204, and/or 512 of FIGS. 1, 2, and 5) to perform at least one remedial action, in accordance with at least one embodiment. The method may be performed by a controller device (e.g., the controller device 112, 204, and/or 512 of FIGS. 1, 2, and 5). It should be appreciated that more or fewer operations than those depicted in FIG. 8 may be included in the method 800 and that the operations of method 800 may be executed in any suitable order.

The method 800 may begin at 802, where a computing device (e.g., the controller device 112, 204, or 512) may operate in a first state (e.g., a restricted state). In some embodiments, the computing device may be associated with an interaction area having a first access point (e.g., access point 210 of FIG. 2) and a second access point (e.g., access point 212 of FIG. 2). In some embodiments, a light curtain (e.g., light curtain 218 of FIG. 2) may be generated at the first access point of the interaction area. In some embodiments, operating in the first state comprises restricting access to the interaction area at the second access point (e.g., the access point 212) of the interaction area.

At 804, while operating in the first state, the computing device may detect a first breach of the light curtain. By way of example, the controller device 204 may receive from the one or more sensors (e.g., the sensor device(s) 514 of FIG. 5 that provide light curtain 218 of FIG. 2, etc.), sensor data indicating an object is interrupting some portion of the light curtain.

At 806, the computing device may transition to operating in a second state (e.g., a ready state) based at least in part on detecting the first breach. In some embodiments, operating in the second state comprises enabling access to the interaction area at the second access point (e.g., opening and/or unlocking gate 404 of FIG. 4).

At 808, while operating in the second state, the computing device may detect a second breach of the light curtain. For example, the controller device 204 may receive from the one or more sensors (e.g., the sensor device(s) 514 of FIG. 5 that provide light curtain 218 of FIG. 2, etc.), sensor data indicating an object is interrupting some portion of the light curtain.

At 810, the computing device may perform at least one remedial action based at least in part on detecting the second breach of the light curtain while operating in the second state. By way of example, the computing device may transmit, via the wireless communications transmitter device to the mobile drive unit, a command to halt. In some embodiments, a transmission of a radio signal at a particular frequency range (e.g., 120-130 MHz) may be considered a command to halt. The controller device may continuously/ periodically transmit such a signal for the duration it operates in the "breach" state." In some embodiments, receipt of the command by the mobile drive unit may cause the mobile drive unit to halt movement. In some embodiments, the mobile drive unit may not resume motion until they have stopped receiving the halt command/signal. In some embodiments, the mobile drive units may be configured to wait some period of time (e.g., 5 seconds) from last receiving the halt command/signal before resuming operations.

Figure 9:
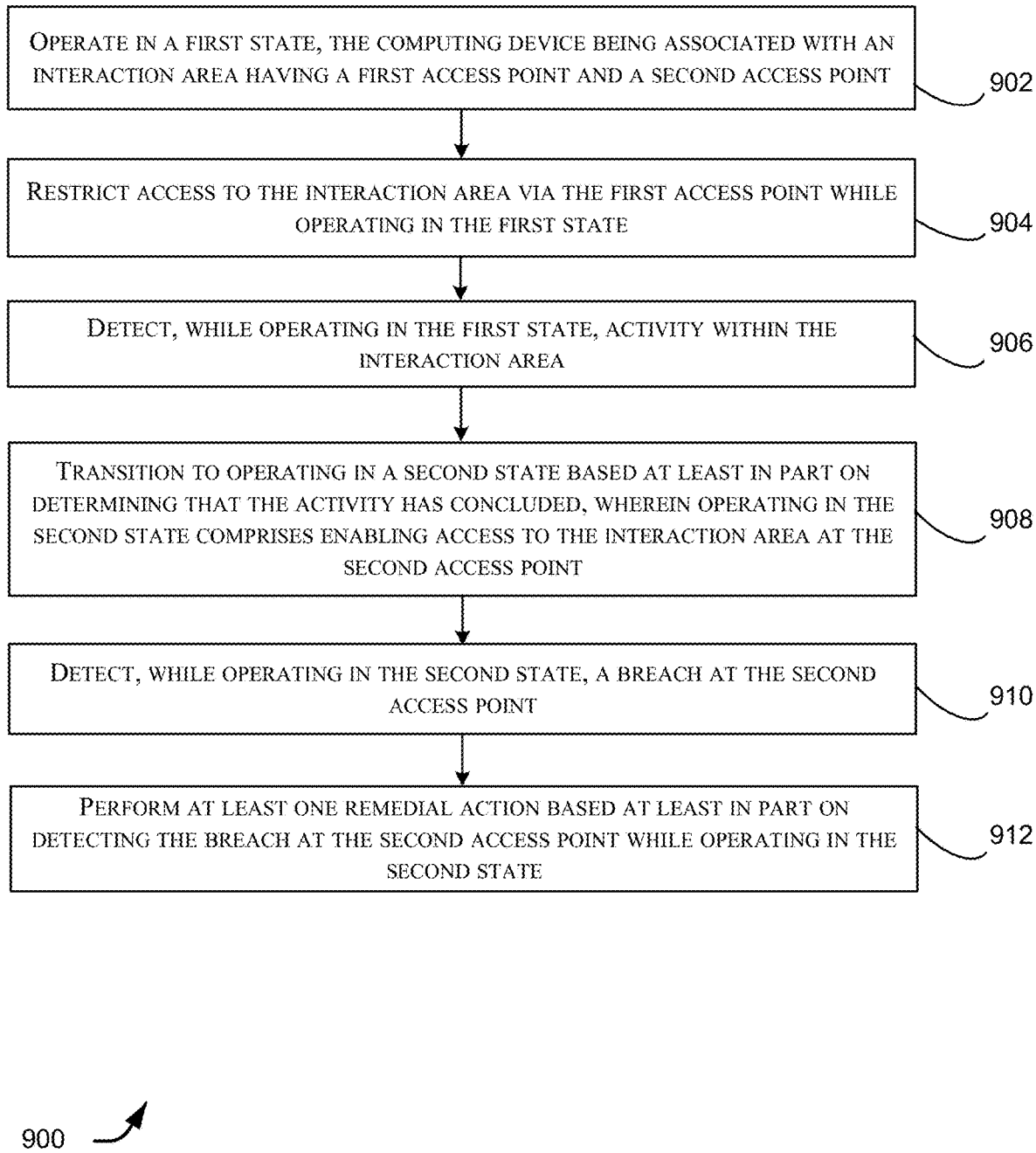
FIG. 9 is a flowchart illustrating another example method for utilizing a controller device to perform at least one remedial action.

FIG. 9 is a flowchart illustrating another example method 900 for utilizing a controller device (e.g., the controller device 112, 204, and/or 512 of FIGS. 1, 2, and 5) to perform at least one remedial action. The operations of method 900 may be performed by a computing device (e.g., the controller device 112, 204, and/or 512 of FIGS. 1, 2, and 5). It should be appreciated that more or fewer operations than those depicted in FIG. 9 may be included in the method 900 and that the operations of method 900 may be executed in any suitable order.

The method may begin at 902, where the computing device may operate in a first state. The computing device may be associated with an interaction area (e.g., the interaction area 208 of FIG. 2) having a first access point (e.g., access point 212) and a second access point (e.g., access point 210).

At 904, the computing device may restrict access to the interaction area via the first access point while operating in the first state. By way of example, the computing device may directly or indirectly cause a physical barrier (e.g., the gate 404 of FIG. 4) to be closed and/or locked to restrict an operator from being able to enter the interaction area 208.

At 906, the computing device may detect, while operating in the first state, activity within the interaction area. By way of example, the computing device may receive from one or more sensors (e.g., the sensor device(s) 514 of FIG. 5, located at location 214 and 216 of FIG. 2), sensor data indicating motion within the interaction area 208.

At 908, the computing device may transition to operating in a second state (e.g., ready) based at least in part on determining that the activity has concluded. For example, the computing device may determine, based at least in part on the sensor data and/or subsequent sensor data, that a MDU has dropped off a storage container and left the interaction area 208, that no movement has been sensed within a predetermined threshold period of time since the time at which the last movement was sensed, etc. In some embodiments, operating in the second state may comprise enabling access to the interaction area at the second access point. By way of example, the computing device may directly or indirectly cause a physical barrier (e.g., the gate 404 of FIG. 4) to be opened and/or unlocked to enable an operator from being able to enter the interaction area 208.

At 910, the computing device may detect, while operating in the second state, a breach at the second access point. By way of example, the computing device may receive from one or more sensors (e.g., the sensor device(s) 514 of FIG. 5 that are generating light curtain 218 of FIG. 2), sensor data indicating a breach of the light curtain 218.

At 912, the computing device may perform at least one remedial action based at least in part on detecting the breach of the light curtain while operating in the second state. By way of example, a remedial action may include transmitting (e.g., broadcasting) a short-range radio signal while operating in the second state. In some embodiments, mobile drive units of the workspace may be configured to halt upon receiving such a signal. The mobile drive units may be configured to remain motionless until such time as they no longer are receiving the signal. In some embodiments, the mobile drive units may be configured to resume activities once the signal has not been received for at least some threshold time period (e.g., 3 seconds, 5 seconds, etc.). In some embodiments, a remedial action may include notifying one or more users (e.g., via any suitable electronic means such as email, text messaging, push notifications, the indicator device 222 of FIG. 2, and/or the like) that the light curtain has been breached and/or that the controller device is operating in the second state.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
a mobile drive unit configured to move a storage container within a workspace;
a plurality of light emitters and receivers generating a light curtain at a first access point of an interaction area of the workspace;
a visual indicator device; and
a controller device, the controller device comprising:
a wireless communications transmitter device;
one or more processors; and
one or more memories configured with executable instructions that, when executed by the one or more processors, cause the controller device to:
operate in a first state, wherein operating in the first state comprises restricting access to the interaction area at a second access point of the interaction area, wherein restricting access to the interaction area comprises causing the second access point to be physically blocked;
display, at the visual indicator device, a first indication of the first state;
detect, while operating in the first state, a first breach of the light curtain;
transition to operating in a second state based at least in part on detecting the first breach, wherein operating in the second state comprises enabling access to the interaction area at the second access point, wherein enabling access to the interaction area comprises causing a physical blockage of the second access point to be removed or moved;
display, at the visual indicator device, a second indication of the second state; and
based at least in part on detecting, while operating in the second state, a second breach of the light curtain:
display, via the visual indicator device, a third indication of a third state; and
transmit, via the wireless communications transmitter device, a command to halt, wherein receipt of the command by at least one mobile drive unit causes the at least one mobile drive unit to halt movement.

2. The system of claim 1, wherein the visual indicator device comprises a plurality of light emitting sources, and wherein displaying the first indication of the first state, the second indication of the second state, and the third indication of the third state utilize differing combinations of the plurality of light emitting sources.

3. The system of claim 1, wherein the wireless communications transmitter device is configured to transmit short-range messages wirelessly.

4. The system of claim 1, wherein restricting access to the interaction area at the second access point comprises locking a gate associated with the second access point, and wherein enabling access to the interaction area at the second access point comprises unlocking the gate associated with the second access point.

5. The system of claim 1, wherein the system further comprises one or more sensors configured to detect an object within the interaction area, and wherein the one or more processors are further configured to:
receive sensor data from the one or more sensors, wherein the transition to operating in the second state occurs further based at least in part on the sensor data received.

6. A computer-implemented method, comprising:
operating a computing device in a first state, the computing device being associated with an interaction area having a first access point and a second access point, wherein a light curtain is generated at the first access point of the interaction area, and wherein operating in the first state comprises restricting access to the interaction area at the second access point of the interaction area, wherein restricting access to the interaction area comprises causing the second access point to be physically blocked;
detecting, while operating in the first state, a first breach of the light curtain;
transitioning to operating in a second state based at least in part on detecting the first breach, wherein operating in the second state comprises enabling access to the interaction area at the second access point, wherein enabling access to the interaction area comprises causing a physical blockage of the second access point to be removed or moved;
detecting, while operating in the second state, a second breach of the light curtain; and
performing, by the computing device, at least one remedial action based at least in part on detecting the second breach of the light curtain while operating in the second state.

7. The computer-implemented method of claim 6, further comprising:
presenting, via a visual indicator device associated with the interaction area, a first indication of the first state while operating in the first state, the visual indicator device comprising a set of lights, wherein presenting the first indication utilizes a first subset of the set of lights; and
presenting, via the visual indicator device, a second indication of the second state, wherein presenting the second indication utilizes a second subset of the set of lights.

8. The computer-implemented method of claim 6, wherein the at least one remedial action comprises transmitting a short-range signal via a wireless communications protocol, the short-range signal being receivable within a threshold distance of the interaction area, and wherein receipt by the short-range signal by a mobile drive unit causes the mobile drive unit to halt motion.

9. The computer-implemented method of claim 6, further comprising:
receiving, from a remote device different from the computing device, an override message corresponding to the second state; and
transitioning, by the computing device, to the second state in response to receiving the override message from the remote device.

10. The computer-implemented method of claim 6, further comprises:
determining that an object has exited the interaction area, wherein transitioning to operating in the second state is further based at least in part on determining that the object has exited the interaction area.

11. The computer-implemented method of claim 6, wherein restricting access to the interaction area at the second access point of the interaction area comprises transmitting, to an access device associated with the second access point, a request to restrict access to the interaction area, wherein the access device is configured to trigger a locking device at the second access point to restrict access to the interaction area.

12. The computer-implemented method of claim 6, further comprising:
receiving, from a plurality of sensors located within the interaction area, first sensor data indicating an object located at a first location corresponding to a first sensor and second sensor data indicating the object at a second location corresponding to a second sensor, wherein transitioning to operating in the second state is further based at least in part on an order associated with receipt of the first sensor data and the second sensor data.

13. The computer-implemented method of claim 12, wherein transitioning to operating in the second state is further based at least in part on corresponding times at which the first sensor data and the second sensor data was received.

14. The computer-implemented method of claim 12, wherein the first sensor data and the second sensor data correspond, at least in part, to conveyance of a container by a mobile drive unit, and wherein the container is placed within the interaction area by the mobile drive unit via the first access point.

15. A non-transitory computer-readable storage medium comprising computer-readable instructions that, upon execution by one or more processors of a computing device, cause the computing device to perform operations comprising:
operating in a first state, the computing device being associated with an interaction area having a first access point and a second access point;
restricting access to the interaction area via the first access point while operating in the first state, wherein restricting access to the interaction area comprises causing the first access point to be physically blocked;
detecting, while operating in the first state, activity within the interaction area;
transitioning to operating in a second state based at least in part on determining the activity has concluded, wherein operating in the second state comprises enabling access to the interaction area at the first access point, wherein enabling access to the interaction area comprises causing a physical blockage of the first access point to be removed or moved;
detecting, while operating in the second state, a breach at the second access point; and
performing at least one remedial action based at least in part on detecting the breach at the second access point while operating in the second state.

16. The non-transitory computer-readable storage medium of claim 15, wherein the activity corresponds to placement of a container within the interaction area, the placement being performed by a mobile drive unit.

17. The non-transitory computer-readable storage medium of claim 15, wherein detecting the breach at the second access point utilizes a light curtain positioned at the second access point.

18. The non-transitory computer-readable storage medium of claim 15, wherein the at least one remedial action comprises:
transitioning to operating in a third state based at least in part on detecting the breach at the second access point;
presenting an indication of the third state at a visual indicator device associated with the interaction area; and
transmitting a short-range signal indicating a command to halt, wherein receipt of the short-range signal by at least one mobile drive unit operating within a threshold distance of the interaction area causes the at least one mobile drive unit to halt motion while the short-range signal is being received.

19. The non-transitory computer-readable storage medium of claim 18, wherein executing the computer-executable instructions causes the computing device to perform further operations comprising:
receiving an override message while operating in the third state; and
transitioning from the third state to the second state in response to receiving the override message, wherein transitioning from the third state to the second state comprises ceasing transmission of the short-range signal, and wherein ceasing transmission of the short-range signal causes the at least one mobile drive unit to resume motion.

* * * * *